US012693525B2

(12) United States Patent
Suzuki et al.

(10) Patent No.: US 12,693,525 B2
(45) Date of Patent: Jul. 28, 2026

(54) IMAGE PROJECTION DEVICE

(71) Applicant: QD LASER, INC., Kawasaki (JP)

(72) Inventors: Makoto Suzuki, Kawasaki (JP); Seiji Morino, Kawasaki (JP)

(73) Assignee: QD LASER, INC., Kawasaki (JP)

( * ) Notice: Subject to any disclaimer, the term of this patent is extended or adjusted under 35 U.S.C. 154(b) by 277 days.

(21) Appl. No.: 18/709,339

(22) PCT Filed: Nov. 4, 2022

(86) PCT No.: PCT/JP2022/041218

§ 371 (c)(1),
(2) Date: May 10, 2024

(87) PCT Pub. No.: WO2023/090173

PCT Pub. Date: May 25, 2023

(65) Prior Publication Data

US 2025/0044579 A1    Feb. 6, 2025

(30) Foreign Application Priority Data

Nov. 22, 2021    (JP) ................................. 2021-189364

(51) Int. Cl.
G02B 26/10 (2006.01)
G02B 27/00 (2006.01)
G02B 27/01 (2006.01)

(52) U.S. Cl.
CPC ....... G02B 26/101 (2013.01); G02B 27/0093 (2013.01); G02B 27/0172 (2013.01);
(Continued)

(58) Field of Classification Search
CPC ............................................. G02B 2027/0187
See application file for complete search history.

(56) References Cited

U.S. PATENT DOCUMENTS

2003/0095081 A1    5/2003    Furness, III
2008/0212195 A1    9/2008    Yamamoto
(Continued)

FOREIGN PATENT DOCUMENTS

JP    2008-046253 A    2/2008
JP    2009-122550 A    6/2009
(Continued)

OTHER PUBLICATIONS

Extended European Search Report for counterpart European Patent Application No. 22895455.8 dated Feb. 12, 2025 (12 sheets).
(Continued)

*Primary Examiner* — Edmond C Lau
(74) *Attorney, Agent, or Firm* — Kratz, Quintos & Hanson, LLP

(57) ABSTRACT

An image projection device includes a projection unit converging image light beams emitted in different directions from a scanning unit at a first convergence point in user's eye, a reflection unit converging the image light beams at a second convergence point before the projection unit, an optical member being provided between the projection unit and the reflection unit, converting the image light beams into convergent light beams, and causing the image light beams to enter the projection unit as diffusion light beams a drive unit moving the reflection unit, a detection unit detecting a direction in which user's pupil has moved, and a drive control unit controlling the drive unit to move the reflection unit so that incident positions of the image light beams on the optical member change according to the direction in which the pupil has moved.

9 Claims, 14 Drawing Sheets

(52) U.S. Cl.
CPC ..... *G02B 27/0176* (2013.01); *G02B 27/0179* (2013.01); *G02B 2027/0187* (2013.01); *G02B 2207/101* (2013.01)

(56) References Cited

U.S. PATENT DOCUMENTS

| | | | | |
|---|---|---|---|---|
| 2012/0139817 | A1 | 6/2012 | Freeman | |
| 2017/0068091 | A1 | 3/2017 | Greenberg | |
| 2018/0203234 | A1* | 7/2018 | Fiess .................... | G02B 27/017 |
| 2018/0373024 | A1 | 12/2018 | Sugawara | |
| 2020/0014891 | A1* | 1/2020 | Suzuki ................. | H04N 9/3129 |
| 2021/0173199 | A1 | 6/2021 | Suzuki | |

FOREIGN PATENT DOCUMENTS

| | | |
|---|---|---|
| JP | 2017-116669 A | 6/2017 |
| JP | 2017-515161 A | 6/2017 |
| WO | 2017/110370 A1 | 6/2017 |
| WO | 2019/065245 A1 | 4/2019 |

OTHER PUBLICATIONS

K, Guttag; "EyeWay Vision Part 3: Analysis—KGOnTech"; Sep. 7, 2021; Retrieved from the Internet: URL: http://web.archive/org/web/20210910225311/https://kguttag.com/2021/09/07/eyeway-vision-part-3-analysis/ (21 sheets).

Boris Greenberg Boris: "EyeWay Vision: Highly Efficient Immersive AR Glasses Using Gaze-locked Exit Pupil Steering"; SPIE AVR21 Industry Talks II; Apr. 5, 2021; p. 54; Retrieved from the Internet: URL: https://www.spiedigitallibrary.org/conference-proceedings-ofspie/11764/117641P/EyeWay-Vision--Highly-Efficient-Immersive-AR-Glasses-Using-Gaze/10.1117/12.2598227.full [video recording of conference presentation].

International Search Report for International Application No. PCT/JP2022/041218 dated Jan. 24, 2023 (3 sheets, 2 sheets translation, 5 sheets total).

Written Opinion of the International Searching Authority for International Application No. PCT/JP2022/041218 dated Jan. 24, 2023 (4 sheets).

Office Action of Japanese Patent Application No. 2021-189364: Notice of Reasons for Refusal issued Dec. 19, 2023 (2 sheets, 2 sheets translation, 4 sheets total).

International Preliminary Report on Patentability (IB/373) and English Translation of the Written Opinion of the International Searching Authority for International Application No. PCT/JP2022/041218 mailed Jun. 6, 2024 (6 sheets).

* cited by examiner

IMAGE PROJECTION DEVICE

TECHNICAL FIELD

The present invention relates to an image projection device.

BACKGROUND ART

Image projection devices that directly project images onto the retina of the user using a light beam emitted from a light source are known. In such image projection devices, a method called Maxwellian view is used. In the Maxwellian view, the image light beam forming an image is converged within the eye of the user and then projected onto the retina, and thereby the image is projected onto the retina. For example, proposed is an image projection device including: a projection unit that converges a plurality of image light beams emitted from a scanning unit in different directions by being scanned by the scanning unit at a first convergence point in the eye of the user and then projects the image light beams onto the retina; a reflection unit that converges the plurality of image light beams emitted from the scanning unit at a second convergence point before the projection unit; and an optical member that is provided at the second convergence point and converts each of the plurality of image light beams into a convergent light beam and causes the convergent light beam to enter the projection unit as a diffusion light beam (for example, Patent Document 1).

Further, it has been proposed that a movable mirror is provided on optical paths of a plurality of image light beams emitted from a scanning unit, and the attitude of the movable mirror is controlled in accordance with the movement of the pupil of the user, so that the image light beams enter the pupil even when the pupil moves (for example, Patent Document 2).

PRIOR ART DOCUMENT

Patent Document

Patent Document 1: International Publication No. 2019/065245
Patent Document 2: Japanese Patent Application Laid-Open No. 2009-122550

SUMMARY OF THE INVENTION

Problem to be Solved by the Invention

In the image projection device including the projection unit, the reflection unit, and the optical member between the scanning unit and the user's eye as described in Patent Document 1, it is desired to realize the incidence of the image light beam on the pupil by a simple method even when the user's pupil moves.

The present invention has been made in view of the above problem, and an object of the present invention is to make an image light beam enter the pupil of the user even when the pupil moves.

Means for Solving the Problem

The present invention is an image projection device including: a light source; a scanning unit that scans an image light beam emitted from the light source; a projection unit that is disposed in front of an eye of a user, and converges a plurality of image light beams emitted in different directions from the scanning unit by being scanned by the scanning unit at a first convergence point in the eye of the user and then projects the plurality of image light beams onto a retina to project an image onto the retina; a reflection unit that converges the plurality of image light beams emitted in the different directions from the scanning unit at a second convergence point before the projection unit; an optical member that is provided between the projection unit and the reflection unit, converts each of the plurality of image light beams into a convergent light beam, condenses each of the plurality of image light beams at a condensing point before the projection unit, and then causes each of the plurality of image light beams to enter the projection unit as a diffusion light beam; a drive unit configured to move the reflection unit; a detection unit configured to detect a direction in which a pupil of the user has moved; and a drive control unit configured to control the drive unit to move the reflection unit so that positions where the plurality of image light beams enter the optical member change in accordance with the direction in which the pupil has moved, which is detected by the detection unit.

In the above configuration, the configuration where when the pupil has moved from a direction facing the front with respect to a face of the user to another direction, the drive control unit controls the drive unit to move the reflection unit so that incident positions of the plurality of image light beams on the optical member are moved from a center part of the optical member to a region on a side opposite to a direction corresponding to the direction in which the pupil has moved with respect to a direction in which the plurality of image light beams pass through the optical member, thereby causing the optical member to refract the plurality of image light beams that have entered the optical member in the direction corresponding to the direction in which the pupil has moved may be employed.

In the above configuration, the configuration where when the pupil has moved from a direction facing the front with respect to a face of the user to another direction, the drive control unit controls the drive unit to move the reflection unit so that at least an image light beam corresponding to a center of the image among the plurality of image light beams enters the pupil from a side opposite to the direction in which the pupil has moved with respect to a direction in which the pupil after movement is facing and is projected onto a region of the retina on a side of the direction in which the pupil has moved may be employed.

In the above configuration, the configuration where a projection control unit that controls projection of the image light beam is provided, the drive unit moves the reflection unit so that the reflection unit swings about a swing center point near a center part of the reflection unit, and the projection control unit projects an image light beam corresponding to an approximate center of the image among the plurality of image light beams to the swing center point may be employed.

In the above configuration, the configuration where the optical member has image height characteristics in which a distance between the optical member and the condensing point of the image light beam is substantially constant even when the reflection unit moves and thereby a region on which the plurality of image light beams are incident changes may be employed.

In the above configuration, the configuration where a ratio of an optical path length of the image light beam between the reflection unit and the second convergence point to an optical path length of the image light beam between the scanning unit and the reflection unit is substantially the same as a ratio of an optical path length of the image light beam between the second convergence point and the projection unit to an optical path length of the image light beam between the projection unit and the first convergence point even when the reflection unit moves may be employed.

In the above configuration, the configuration where a convergence angle at which the plurality of image light beams converge at the first convergence point is substantially constant even when the reflection unit moves may be employed.

In the above configuration, the configuration where a light guide member that includes the projection unit, is formed of a glass material through which the plurality of image light beams pass, and reflects the plurality of image light beams by a plurality of reflection surfaces to guide the plurality of image light beams to the projection unit is provided, and the optical member is provided between the light guide member and the reflection unit may be provided.

In the above configuration, the configuration where the projection unit and the reflection unit are concave mirrors, and the optical member is a convex lens may be employed.

Effects of the Invention

The present invention can make an image light beam enter the pupil of the user even when the pupil moves.

MODES FOR CARRYING OUT THE INVENTION

Hereinafter, an embodiment of the present invention will be described with reference to the drawings.

Embodiment

Figure 1:
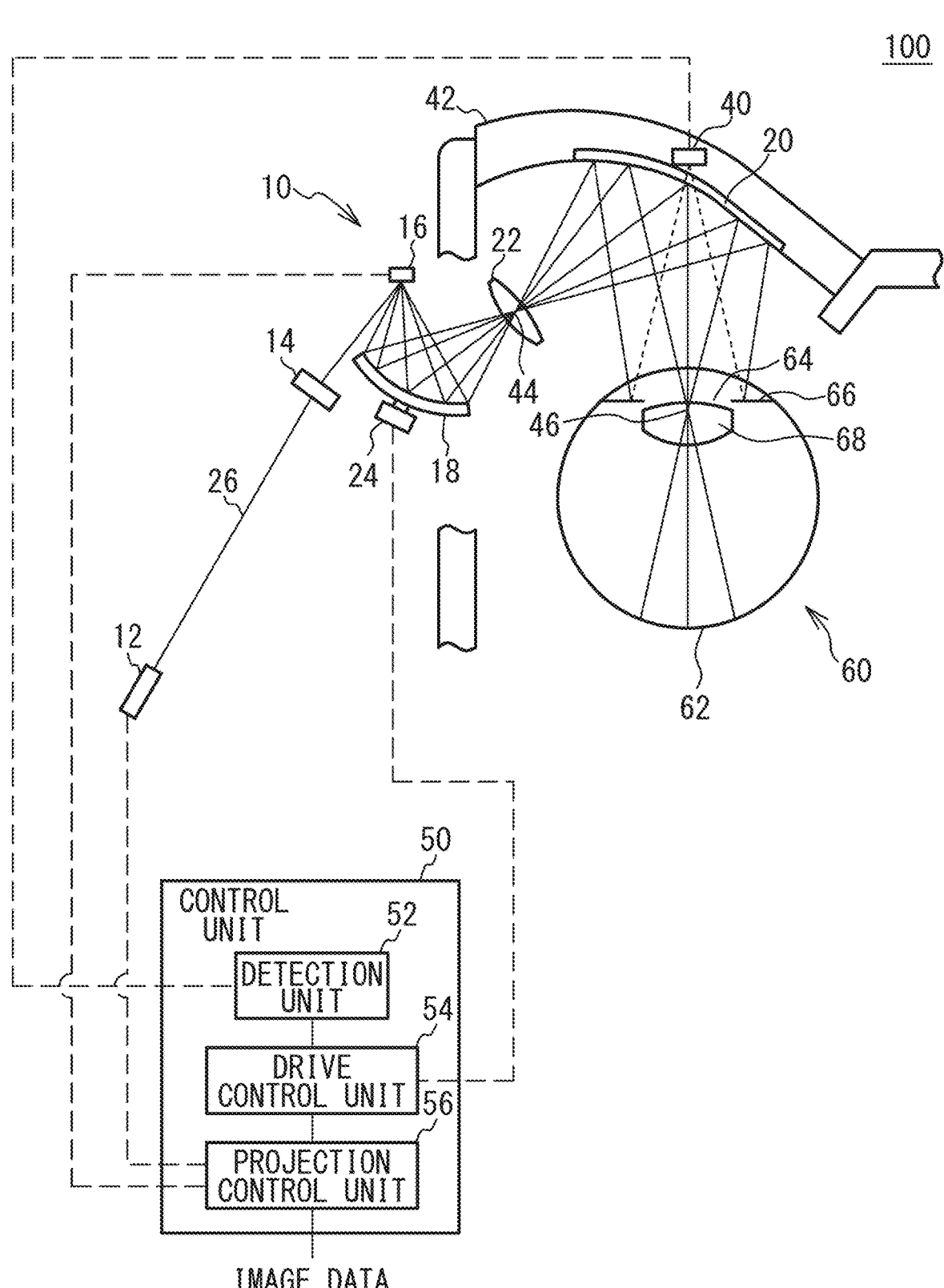
FIG. 1 illustrates an image projection device in accordance with an embodiment.
Figure 2:
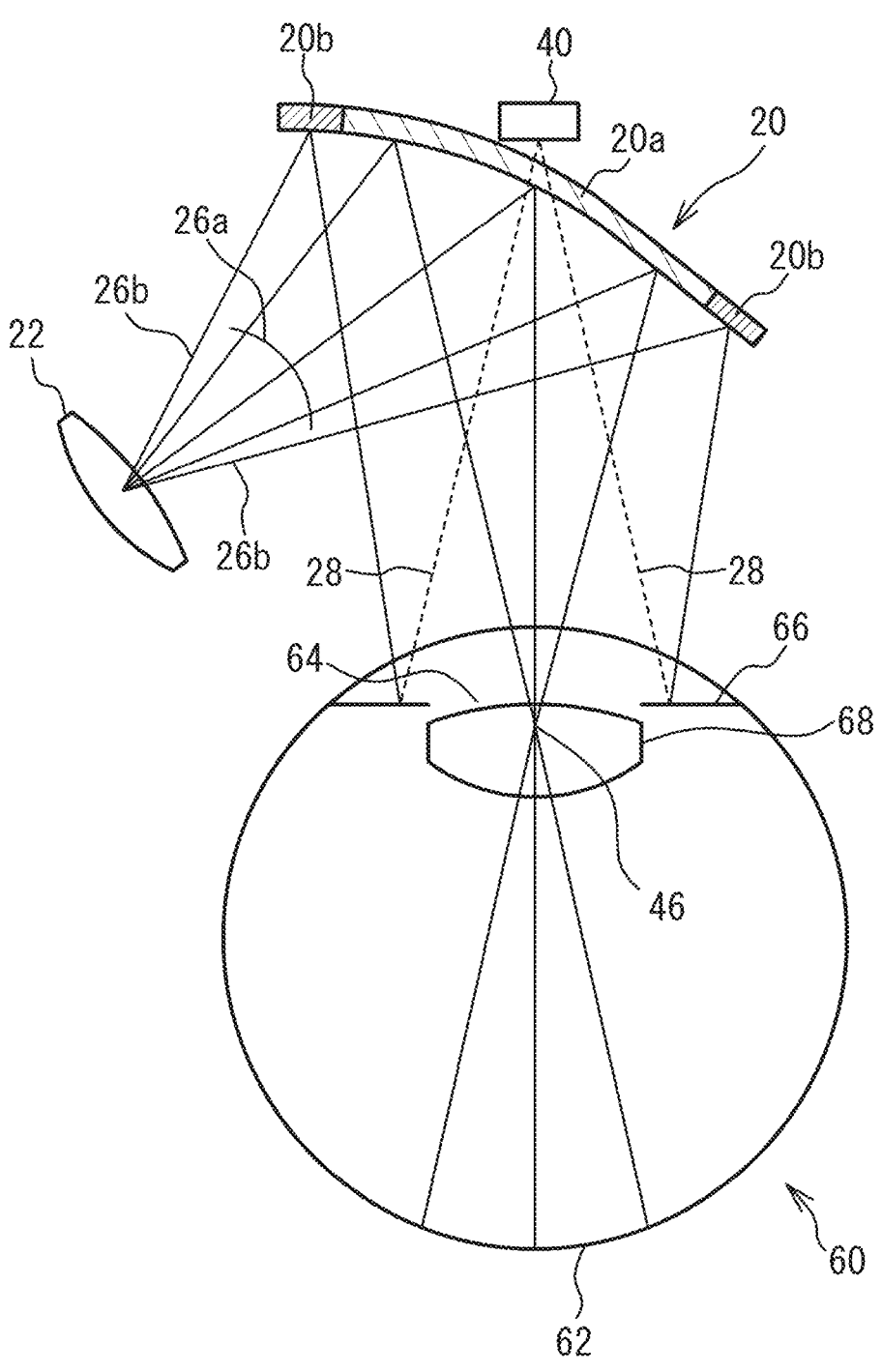
FIG. 2 illustrates the vicinity of a projection mirror in FIG. 1.

FIG. 1 illustrates an image projection device 100 in accordance with an embodiment. FIG. 2 illustrates the vicinity of a projection mirror 20 in FIG. 1. In FIG. 1, electrical connections are illustrated with broken lines. The image projection device 100 is a retinal projection type head-mounted display using Maxwellian view, in which image light beams (laser beams) for causing a user to visually recognize an image are directly projected onto a retina 62 of the user.

As illustrated in FIG. 1, the image projection device 100 includes a projection unit 10, an optical detector 40, and a control unit 50. The projection unit 10 includes a light source 12, a lens 14, a scanning unit 16, a reflecting mirror 18, the projection mirror 20, a lens 22, and a drive unit 24. The components of the projection unit 10 are fixed to, for example, a spectacle-type frame 42. The control unit 50 includes a detection unit 52, a drive control unit 54, and a projection control unit 56.

The light source 12 emits, for example, a light beam 26 (laser beam) of a single wavelength or a plurality of wavelengths based on instructions from the projection control unit 56. The light beam 26 includes an image light beam for projecting an image onto the retina 62 of an eye 60 of the user and a detection light beam for detecting the movement of a pupil 64 of the eye 60 of the user. The detection light beam is emitted from the same light source 12 as the image light beam, and thus is visible light as the image light beam. The detection light beam may be invisible light emitted from a light source different from that for the image light beam. The projection control unit 56 receives image data from a camera and/or a recording device (not illustrated). The projection control unit 56 controls the emission of the image light beam from the light source 12 on the basis of the input image data. The projection control unit 56 also controls the driving of the scanning unit 16. The projection control unit 56 controls the light source 12 and the scanning unit 16 to control the projection of the image light beam onto the retina 62.

The light source 12 emits the light beam 26 that is visible light of, for example, a red laser beam (wavelength: about 610 nm to 660 nm), a green laser beam (wavelength: about 515 nm to 540 nm), and a blue laser beam (wavelength: about 440 nm to 480 nm) under the control of the projection control unit 56. The light source 12 that emits red, green, and blue laser beams is, for example, a light source in which RGB (red, green, and blue) diode chips and a three-color combining device are integrated. The light source 12 may emit the light beam 26 of a single wavelength.

The control unit 50 is a processor such as a central processing unit (CPU). When a camera is installed at an appropriate position facing the direction of the user's line of sight, the image in the direction of the line of sight captured by the camera can be projected onto the retina 62. Further, an image input from a recording device or the like may be projected, or a camera image and an image from a recording device or the like may be superimposed to project a so-called augmented reality (AR) image. The detection unit 52, the drive control unit 54, and the projection control unit 56 may be operated by the same processor or may be operated by different processors.

The light beam 26 emitted by the light source 12 passes through the lens 14. The lens 14 is a condenser lens that converts the light beam 26 from a diffusion light beam to a convergent light beam. The light beam 26 transmitted through the lens 14 enters the scanning unit 16. The scanning unit 16 (scanner) scans the light beam 26 in two-dimensional directions: the horizontal direction and the vertical direction. The scanning unit 16 is a micro electric mechanical system (MEMS) mirror in the present embodiment. The scanning unit 16 may be a scanning mirror other than the MEMS mirror, or may be potassium tantalate niobate (KTN) or the like.

A plurality of the light beams 26, which are scanned in the two-dimensional directions by the scanning unit 16 and are emitted from the scanning unit 16 in different directions at different times, enter the reflecting mirror 18. The reflecting mirror 18 is a concave mirror having a reflecting surface formed of a curved surface such as a free-form surface, and has a positive condensing power. The plurality of the light beams 26 reflected by the reflecting mirror 18 converge at a convergence point 44 before the projection mirror 20. The lens 22 is provided between the projection mirror 20 and the reflecting mirror 18, for example, at the convergence point 44. The lens 22 is, for example, a biconvex lens. The plurality of the light beams 26 pass through the lens 22 and enter the projection mirror 20. The projection mirror 20 is disposed in front of the eye 60 of the user and is fixed to the spectacle-type frame 42 so that the position of the projection mirror 20 with respect to the eye 60 of the user does not move. The projection mirror 20 reflects the plurality of the light beams 26 toward the eye 60 of the user.

Figure 3A:
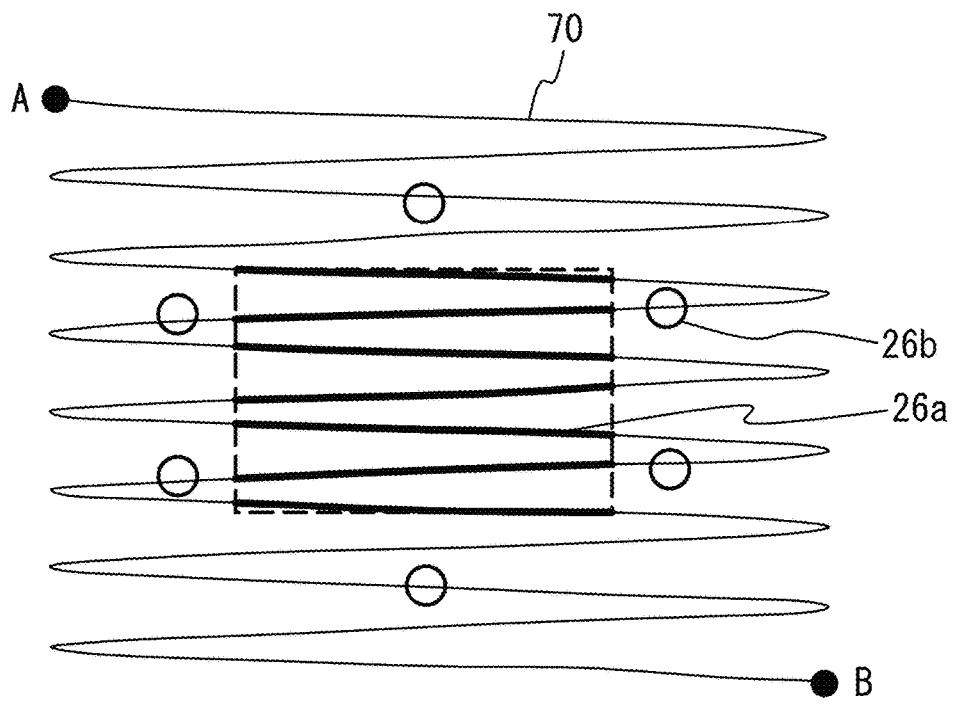
FIG. 3A is a diagram for describing raster scanning.

The image light beam and the detection light beam included in the light beam 26 will be described. As a method of projecting an image onto the retina 62 of the user by scanning the image light beam by the scanning unit 16, there is a method of displaying an image by scanning the image light beam at high speed from the upper left to the lower right of the image (for example, raster scanning). FIG. 3A is a diagram for describing raster scanning. In FIG. 3A, the oscillation of the scanning unit 16 for raster scanning is denoted by reference numeral 70. As illustrated in FIG. 3A, the scanning unit 16 oscillates in the horizontal direction and the vertical direction beyond the area of the image projected onto the retina 62 of the user (illustrated by bold dashed lines in FIG. 3A).

When the image is projected onto the retina 62 by reflecting an image light beam 26a at the points where the scanning unit 16 swings greatly, the distortion of the image projected onto the retina 62 is large. Therefore, the image light beam 26a is scanned in the area where the swing of the scanning unit 16 is small. On the other hand, a detection light beam 26b enters the scanning unit 16 at a timing when the image light beam 26a is not scanned in the oscillation of the scanning unit 16. In other words, the light source 12 emits the image light beam 26a in a period corresponding to the area of the image projected onto the retina 62 and emits the detection light beam 26b during the time outside the area of the image in the oscillation of the scanning unit 16.

Figure 3B:
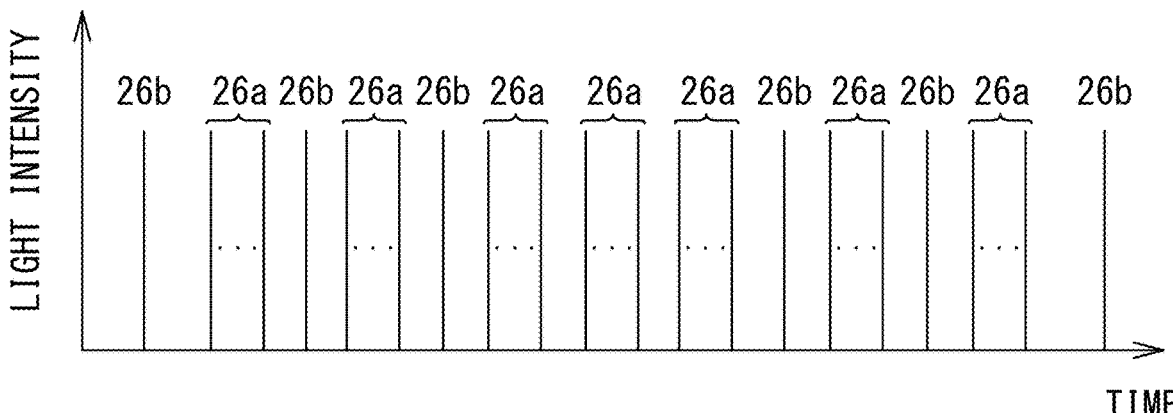
FIG. 3B is a timing chart illustrating the emission timings of image light beams and detection light beams.

FIG. 3B is a timing chart illustrating emission timings of the image light beams 26a and the detection light beams 26b. FIG. 3B illustrates the emission timings of the image light beams 26a and the detection light beams 26b when the scanning unit 16 oscillates from the point A to the point B in FIG. 3A. The light intensity of the image light beam 26a is illustrated as being constant for the sake of simplicity, but appropriately varies based on the image data (the same applies to FIG. 5 described later). The light intensity of the detection light beam 26b may be the same as or different from the light intensity of the immediately preceding or succeeding image light beam 26a, for example. When the detection light beam 26b is visible light, the light intensity of the detection light beam 26b is preferably smaller than the light intensity of the image light beam 26a in consideration of the case where the detection light beam 26b is projected onto the retina 62. In addition, when the detection light beam 26b is visible light, the hue of the detection light beam 26b is preferably the same as the hue of the immediately preceding or succeeding image light beam 26a.

As illustrated in FIG. 3A, one or more detection light beams 26b enter the scanning unit 16. In the present embodiment, it is assumed that six detection light beams 26b enter the scanning unit 16. The detection light beam 26b may be a single-wavelength light beam or a light beam corresponding to one pixel or several pixels of an image projected onto the retina 62.

As illustrated in FIG. 2, the image light beams 26a and the detection light beams 26b enter the projection mirror 20. The projection mirror 20 is a concave half mirror having a reflection surface formed of a curved surface such as a free-form surface in a region 20a on which the image light beams 26a are incident. Therefore, the image light beams 26a reflected by the projection mirror 20 pass through the pupil 64 of the user, converge at a crystalline lens 68 or at a convergence point 46 near the crystalline lens 68, and are then projected onto the retina 62. Thus, the user can visually recognize the image formed by the image light beams 26a. On the other hand, the projection mirror 20 is a concave half mirror having a reflection surface formed of a curved surface such as a free-form surface in regions 20b on which the detection light beams 26b are incident, but has a shape optically discontinuous with the region 20a. Thus, the detection light beam 26b is projected onto an iris 66 when the image light beam 26a passes through the pupil 64 and is projected onto the retina 62. Since the regions 20a and 20b of the projection mirror 20 are half mirrors, the user can visually recognize the external image in a see-through manner.

Figure 4:
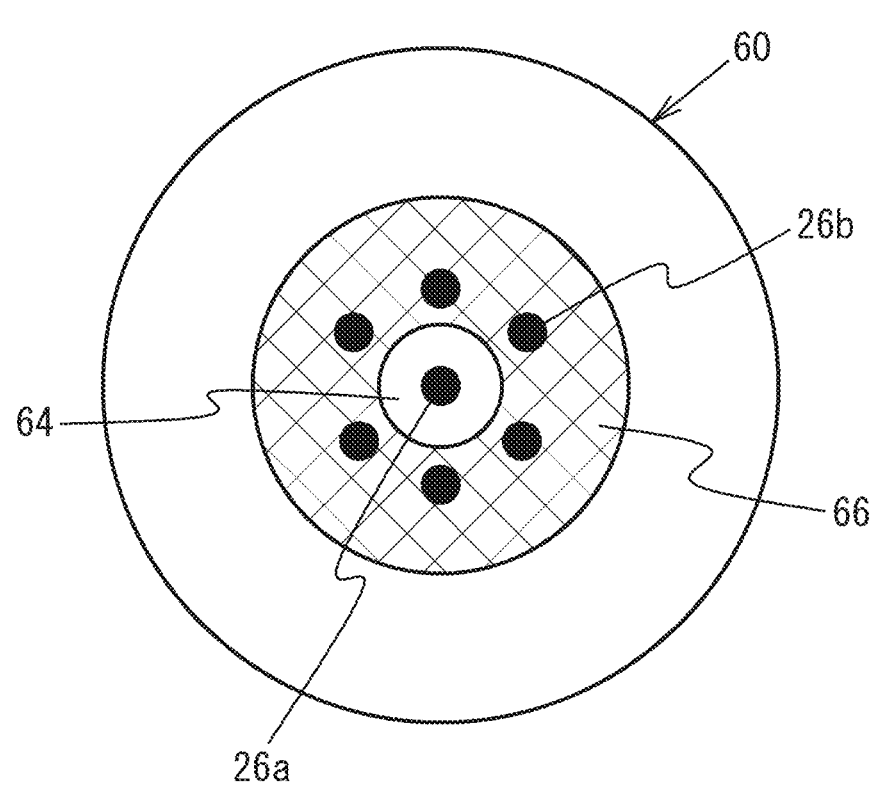
FIG. 4 is a diagram for describing projection of the image light beam and the detection light beam onto the eye of the user.

FIG. 4 is a diagram for describing projection of the image light beam 26a and the detection light beam 26b onto the eye 60 of the user. As illustrated in FIG. 4, the plurality of the detection light beams 26b are projected onto the iris 66 when the image light beam 26a passes through the vicinity of the center of the pupil 64. As described above, since the regions 20b of the projection mirror 20 are optically discontinuous with the region 20a, a plurality of the detection light beams 26b can be projected onto the iris 66 while the image light beam 26a passes through the pupil 64.

The image light beam 26a and the detection light beam 26b are emitted from the light source 12 at predetermined timings with respect to the oscillation of the scanning unit 16. That is, the relative emission timing between the image light beam 26a and the detection light beam 26b is fixed. Therefore, the image light beam 26a and the detection light beam 26b are projected onto the eye 60 with a fixed relative positional relationship. Further, as illustrated in FIG. 3A, a plurality of the detection light beams 26b are reflected at different positions in the oscillation of the scanning unit 16, and thus are projected onto different positions of the iris 66 at different timings. That is, the plurality of the detection light beams 26b are sequentially projected onto different positions of the iris 66.

As illustrated in FIG. 1 and FIG. 2, the optical detector 40 is provided on the spectacle-type frame 42 and is located in front of the eye 60 of the user. The optical detector 40 is, for example, a photodetector. The optical detector 40 detects a reflected light beam 28 of the detection light beam 26b reflected by the iris 66.

Figure 5:
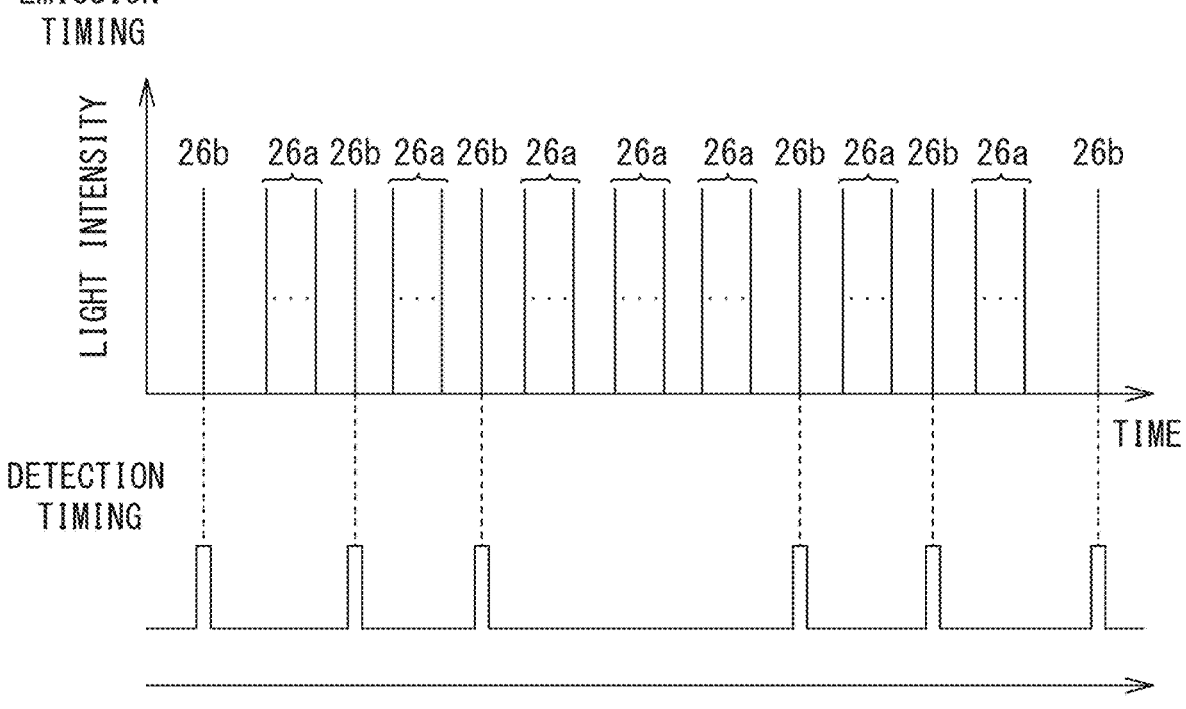
FIG. 5 is a timing chart illustrating detection timings at which an optical detector detects reflected light beams.

FIG. 5 is a timing chart illustrating detection timings at which the optical detector 40 detects the reflected light beams 28. As illustrated in FIG. 5, the detection unit 52 detects the reflected light beam 28 using the optical detector 40 at the timing when the light source 12 emits the detection light beam 26*b*. This makes it possible to know which of the reflected light beam 28 of the detection light beam 26*b* among the plurality of the detection light beams 26*b* is not detected. The timing at which the light source 12 emits the detection light beam 26*b* is controlled by the projection control unit 56, and the timing at which the optical detector 40 detects the reflected light beam 28 is controlled by the detection unit 52. The detection time of the reflected light beam 28 may have a range in consideration of the performance of the optical detector 40.

Although FIG. 1 and FIG. 2 illustrate a case in which the optical detector 40 is provided substantially in front of the eye 60 of the user, the optical detector 40 may be provided at any position as long as the reflected light beam 28 can be detected, for example, near the temple of the spectacle-type frame 42 or near the nose pad. Even when a plurality of the detection light beams 26*b* are projected onto the iris 66, the plurality of the detection light beams 26*b* are sequentially projected onto the iris 66 as described above, and thus reflected light beams 28 of the plurality of the detection light beams 26*b* can be detected by one optical detector 40.

Figure 6A:
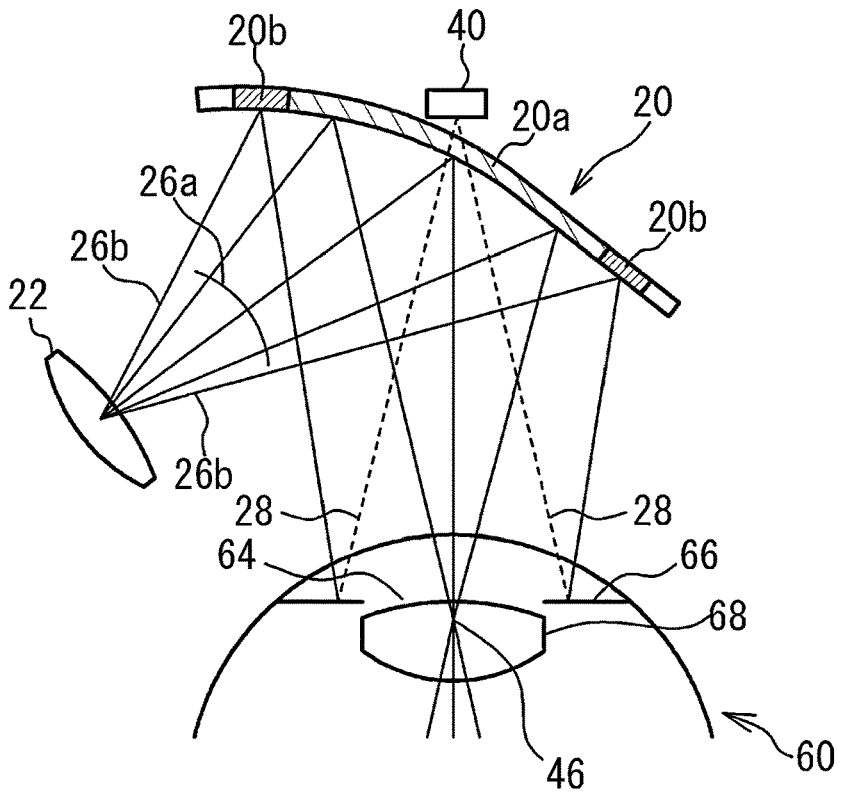
FIG. 6A and FIG. 6B are diagrams for describing detection of a reflected light beam by the optical detector.
Figure 6B:
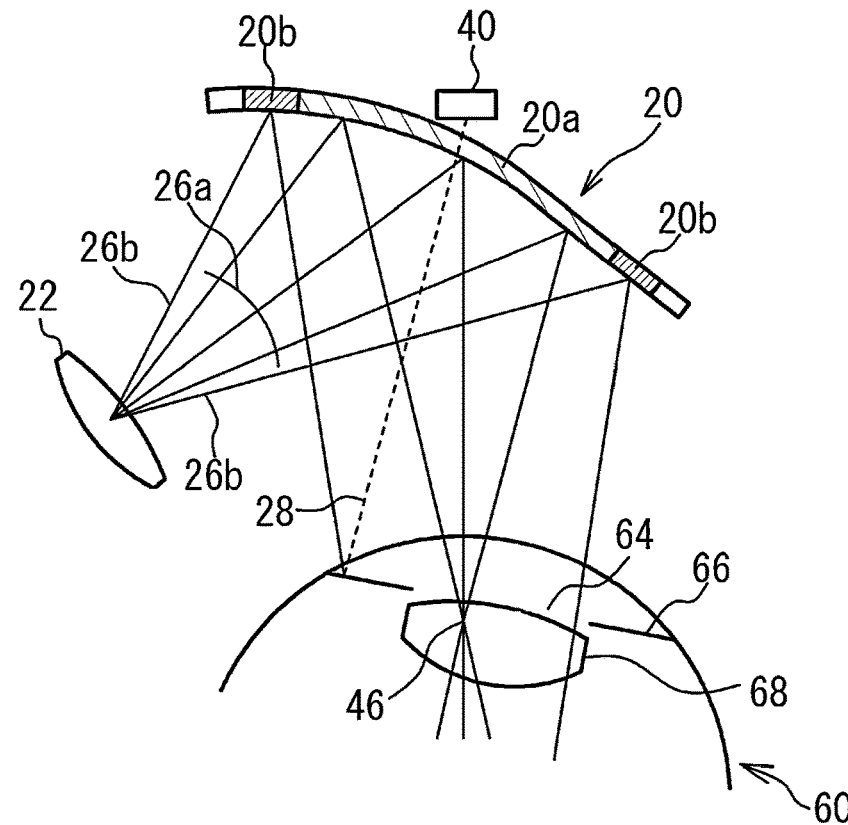

FIG. 6A and FIG. 6B are diagrams for describing detection of the reflected light beam 28 by the optical detector 40. FIG. 6A illustrates a state where the user is looking straight ahead, and FIG. 6B illustrates a state where the user moves the eye 60 to look right. As illustrated in FIG. 6A, when the user is looking straight ahead, the image light beams 26*a* pass through the pupil 64 and are projected onto the retina 62, and all of the plurality of the detection light beams 26*b* are projected onto the iris 66. When the detection light beam 26*b* is projected onto the iris 66, the reflected light beam 28 with a relatively large intensity is generated. On the other hand, as illustrated in FIG. 6B, when the user rotates the eye 60 to look right, some detection light beams 26*b* of a plurality of the detection light beams 26*b* pass through the pupil 64 and are projected onto the retina 62. When the detection light beam 26*b* is projected onto the retina 62, the reflected light beam 28 is unlikely to be generated. Therefore, when the user is looking straight ahead as illustrated in FIG. 6A, the optical detector 40 detects the reflected light beam 28 with a relatively large intensity in all of the plurality of detection light beams 26*b*. In contrast, when the user rotates the eye 60 as illustrated in FIG. 6B, the optical detector 40 hardly detects the reflected light beam 28 in some detection light beams 26*b* of the plurality of the detection light beams 26*b*.

The direction of the detection light beam 26*b* in which the reflected light beam 28 is hardly detected with reference to the position where the image light beam 26*a* is projected on the eye 60 corresponds to the direction in which the pupil 64 has moved. Therefore, the detection unit 52 identifies the detection light beam 26*b* of which the reflected light beam 28 is hardly detected based on the detection results of the reflected light beams 28 by the optical detector 40, and detects the direction in which the pupil 64 has moved with respect to the face of the user based on the identified detection light beam 26*b*. That is, the direction in which the pupil 64 is facing (the direction of the line of sight) is detected. The state where the optical detector 40 hardly detects the reflected light beam 28 means that the optical detector 40 does not detect the reflected light beam 28 having an intensity equal to or higher than a predetermined value. Therefore, when there is the reflected light beam 28 having an intensity less than a predetermined value among the reflected light beams 28 detected by the optical detector 40, the detection unit 52 identifies the detection light beam 26*b* corresponding to the reflected light beam 28 having an intensity less than the predetermined value and detects the direction of the identified detection light beam 26*b* as the direction in which the pupil 64 have moved.

As illustrated in FIG. 1, the drive unit 24 that moves the reflecting mirror 18 is provided. The drive unit 24 is, for example, an actuator, and moves the reflecting mirror 18 based on instructions from the drive control unit 54. The drive control unit 54 controls the drive unit 24 to move the reflecting mirror 18 in accordance with the direction in which the pupil 64 has moved, which is detected by the detection unit 52. The reflecting mirror 18 is a concave mirror as described above. When its concave curved surface has a vertex in a substantially center part, the reflecting mirror 18 moves so as to swing about the vertex. Among a plurality of the image light beams 26*a*, the image light beam corresponding to the substantial center of the image projected on the retina 62 enters the swing center of the reflecting mirror 18.

Figure 7:
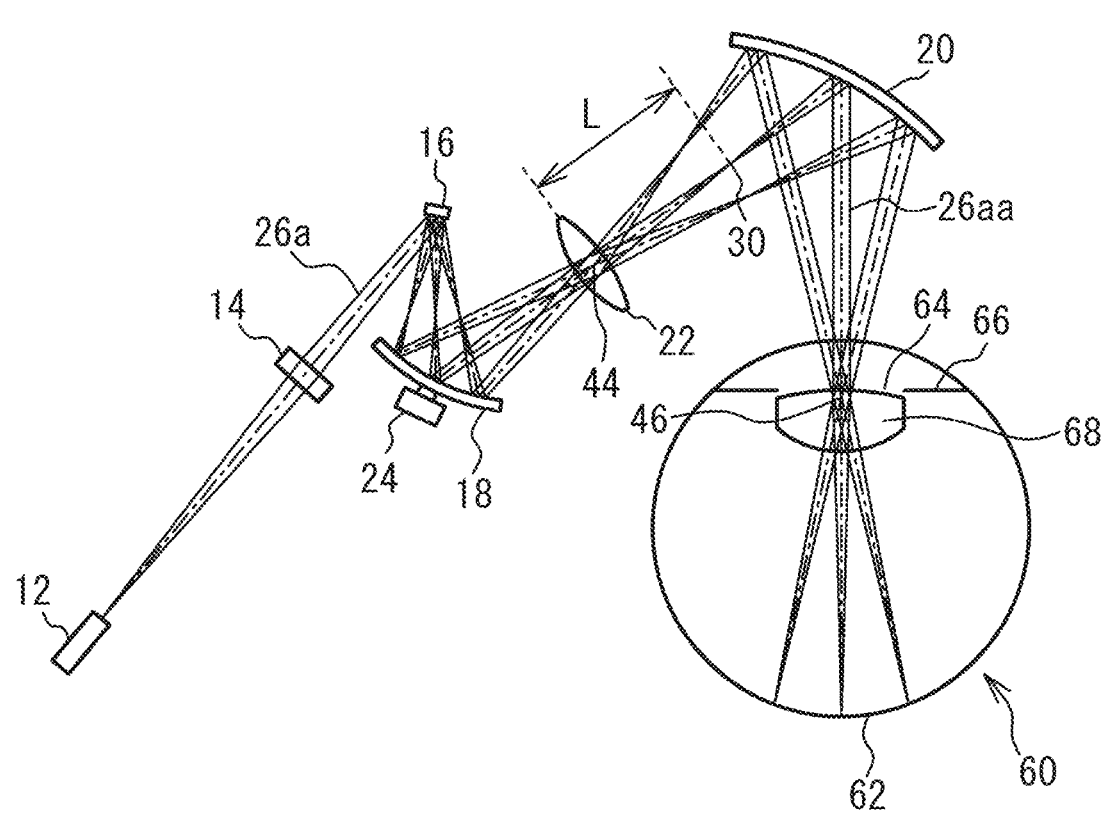
FIG. 7 illustrates an optical system in the embodiment.

FIG. 7 illustrates an optical system in the embodiment. In FIG. 7, only the image light beam 26*a* is illustrated, and the detection light beam 26*b* is not illustrated. As illustrated in FIG. 7, the image light beam 26*a* emitted by the light source 12 passes through the lens 14. The lens 14 is a condenser lens that converts the image light beam 26*a* from a diffusion light beam into a convergent light beam. The image light beam 26*a* transmitted through the lens 14 enters the scanning unit 16 in a state of convergent light. The lens 14 is provided between the light source 12 and the scanning unit 16 in order to make the image light beam 26*a* reflected by the reflecting mirror 18 a substantially parallel light beam.

A plurality of the image light beams 26*a* that are scanned in the two-dimensional directions by the scanning unit 16 and are emitted from the scanning unit 16 in different directions at different times enter the reflecting mirror 18. Each of the plurality of the image light beams 26*a* is condensed before the reflecting mirror 18, and then becomes a diffusion light beam to enter the reflecting mirror 18. Since the reflecting mirror 18 has positive condensing power, each of the plurality of the image light beams 26*a* is reflected by the reflecting mirror 18, and thus is converted from a diffusion light beam into a substantially parallel light beam.

The plurality of the image light beams 26*a* reflected by the reflecting mirror 18 converge at the convergence point 44 before the projection mirror 20. The lens 22 is provided at the convergence point 44. The lens 22 is a condenser lens that converts each of the plurality of the image light beams 26*a* from a substantially parallel light beam into a convergent light beam. The lens 22 is provided at the convergence point 44 to make each of the plurality of the image light beams 26*a* reflected by the projection mirror 20 a substantially parallel light beam. Each of the plurality of the image light beams 26*a* transmitted through the lens 22 is condensed at a condensing point 30 before the projection mirror 20, and then becomes a diffusion light beam to enter the projection mirror 20.

Since the projection mirror 20 has positive condensing power, each of the plurality of the image light beams 26*a* is converted from a diffusion light beam to a substantially parallel light beam by being reflected by the projection mirror 20. The plurality of the image light beams 26*a* converge at the convergence point 46 within the eye 60 of the user. The convergence point 46 is located, for example, in the crystalline lens 68 or near the crystalline lens 68. The image light beam 26*a* is converted from the substantially parallel light beam into a convergent light beam by the crystalline lens 68, and is focused near the retina 62. Thus, the user can visually recognize the image.

Although not illustrated in FIG. 7, the detection light beam 26*b* is also converted by the reflecting mirror 18, the lens 22, and the projection mirror 20 in the same manner as the image light beam 26*a*, and enters the eye 60.

Figure 8:
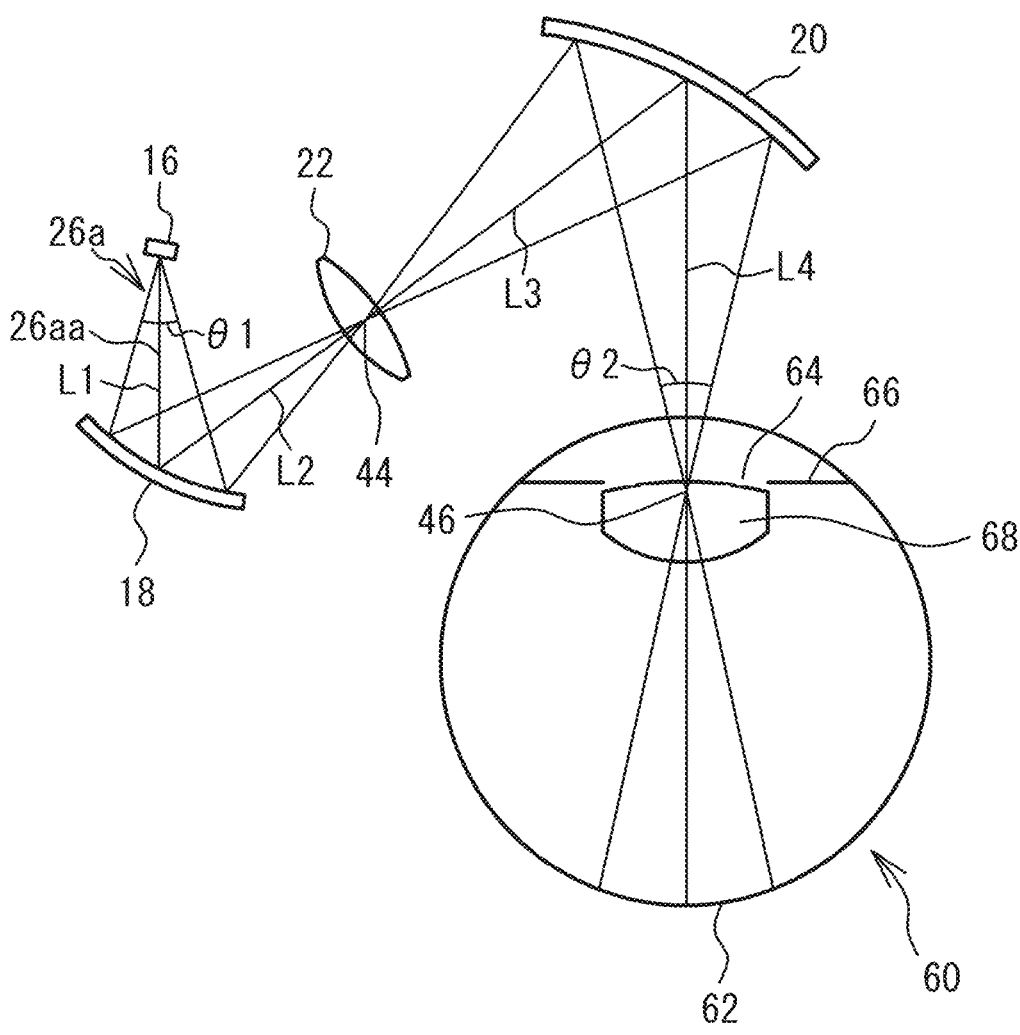
FIG. 8 is a diagram for describing the optical path length of the image light beam.

FIG. 8 is a diagram for describing the optical path length of the image light beam 26*a*. In FIG. 8, an image light beam 26*aa* corresponding to the center of the image projected onto the retina 62 among a plurality of the image light beams 26*a* will be described as an example. As illustrated in FIG. 8, an optical path length L1 of the image light beam 26*aa* between the scanning unit 16 and the reflecting mirror 18 and an optical path length L4 of the image light beam 26*aa* between the projection mirror 20 and the convergence point 46 are different from each other. An optical path length L2 of the image light beam 26*aa* between the reflecting mirror 18 and the convergence point 44 and an optical path length L3 of the image light beam 26*aa* between the convergence point 44 and the projection mirror 20 are different from each other. On the other hand, the ratio (L2/L1) of the optical path length L2 to the optical path length L1 and the ratio (L3/L4) of the optical path length L3 to the optical path length L4 are substantially the same. Therefore, the similar layouts having the same magnification are established, and a scanning angle θ1 of the image light beam 26*a* by the scanning unit 16 and a convergence angle θ2 at which the plurality of the image light beams 26*a* converge at the convergence point 46 are substantially the same. The similarity ratio may be determined by the distance between the projection mirror 20 and the eye 60 of the user, the shape of the user's face, and/or the space on the side of the user's face, etc.

Figure 9:
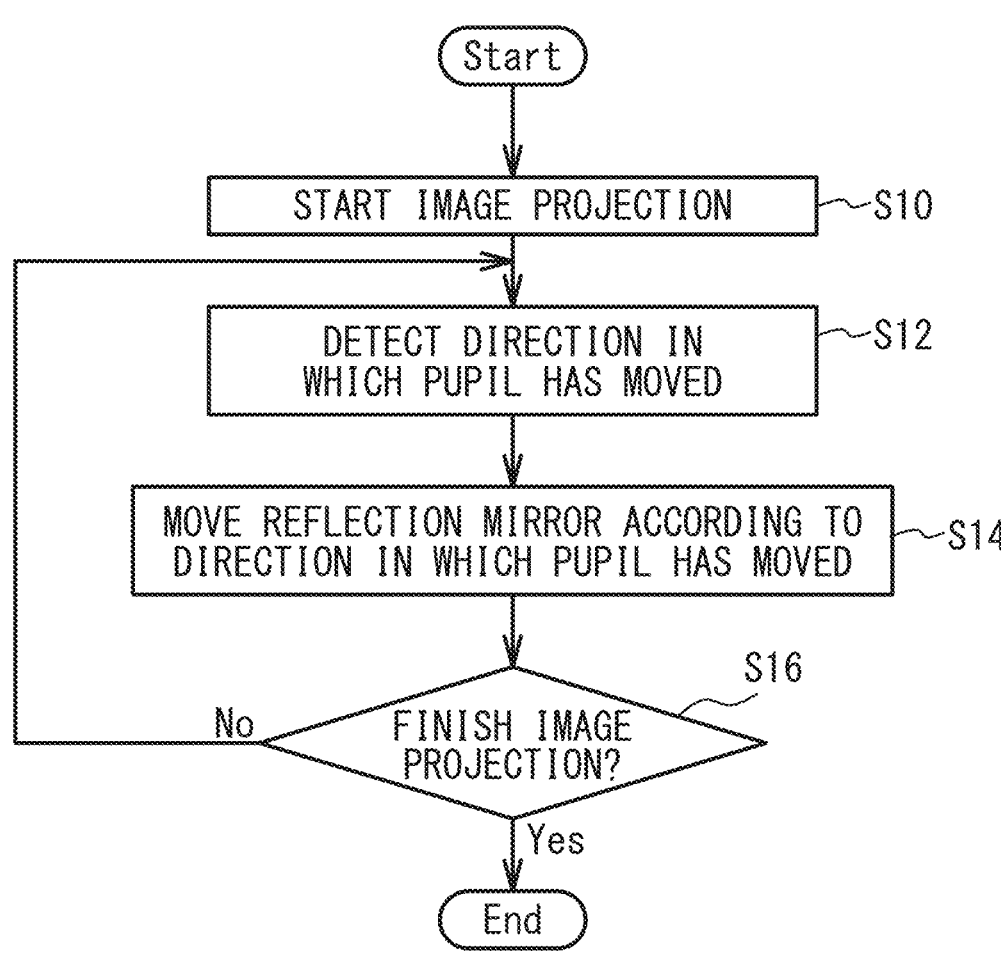
FIG. 9 is a flowchart illustrating an example of control by a control unit in the embodiment.
Figure 10A:
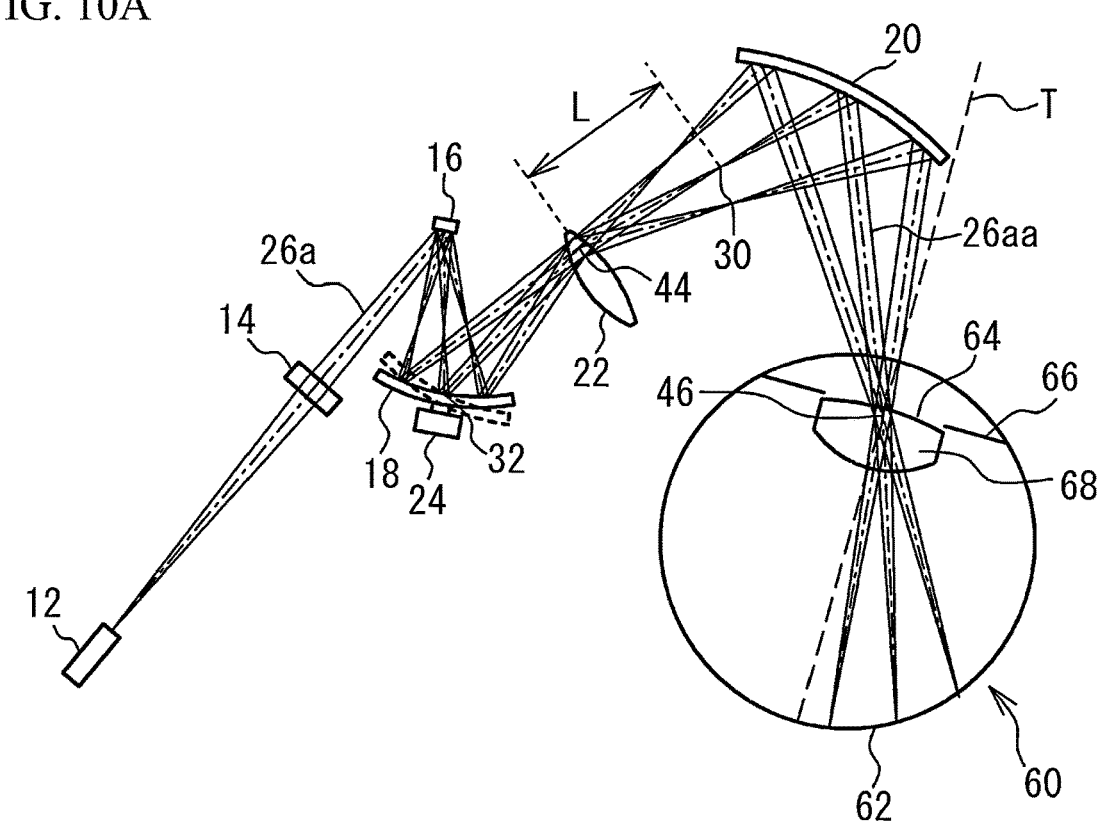
FIG. 10A and FIG. 10B are diagrams for describing control by the control unit in the embodiment.
Figure 10B:
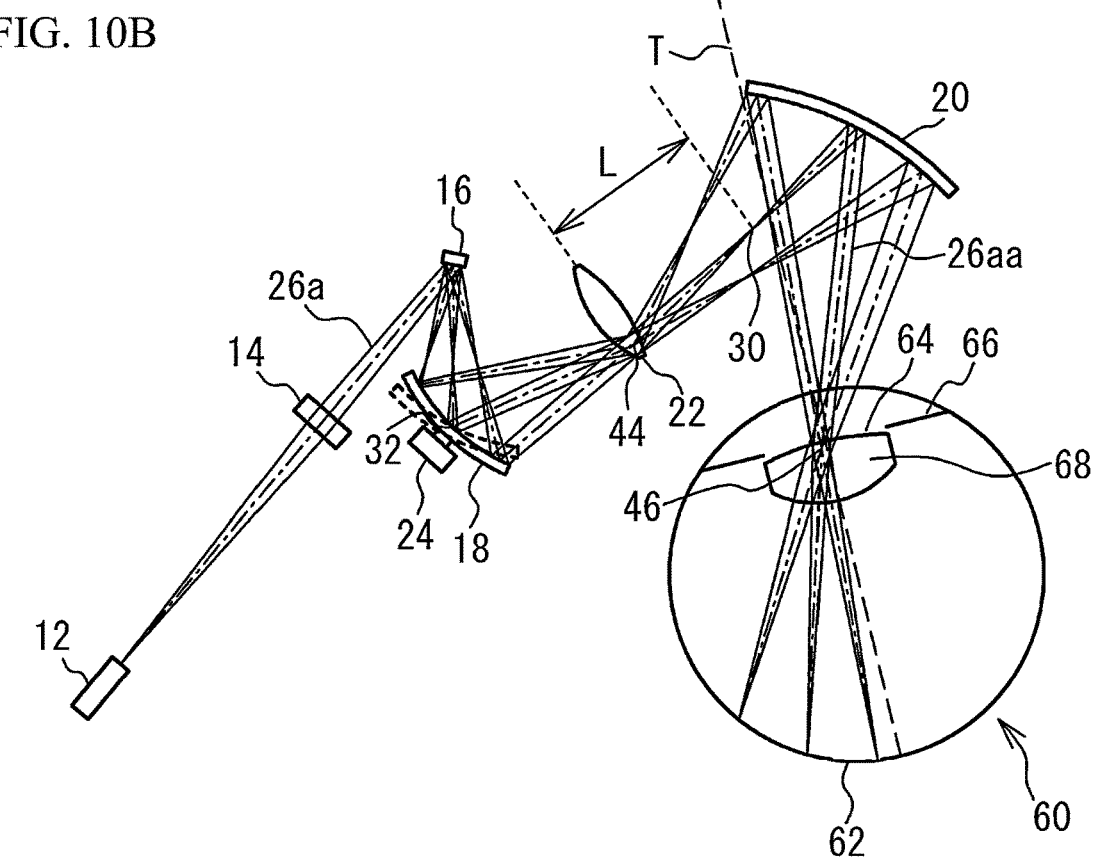

FIG. 9 is a flowchart illustrating an example of control by the control unit 50 in the embodiment. FIG. 10A and FIG. 10B are diagrams for describing control by the control unit 50 in the embodiment. In FIG. 10A and FIG. 10B, the reflecting mirror 18 in FIG. 7 is illustrated by a dotted line. As illustrated in FIG. 9, after the projection control unit 56 starts projection of an image onto the retina 62 of the user (step S10), the detection unit 52 detects the direction in which the pupil 64 has moved with respect to the face of the user based on the detection result of the optical detector 40 (step S12). Then, the drive control unit 54 controls the drive unit 24 to move the reflecting mirror 18 in accordance with the direction in which the pupil 64 has moved, which has been detected by the detection unit 52 (step S14). For example, in the case that the reflecting mirror 18 is a concave mirror and the vertex of the concave surface is located in the substantially center part of the reflecting mirror 18, the reflecting mirror 18 moves so as to swing around the vicinity of the vertex. The projection control unit 56 controls the light source 12 and the scanning unit 16 so that the image light beam 26*aa* corresponding to the approximate center of the image projected onto the retina 62 enters the vicinity of the swing center of the reflecting mirror 18. The swing angle of the reflecting mirror 18 is determined in advance in accordance with the angle at which the pupil 64 is tilted with respect to the front direction of the user's face. The detection unit 52 and the drive control unit 54 repeatedly perform steps S12 to S16 until the image projection is finished (step S16: No), and when the image projection is finished (step S16: Yes), this process is ended.

When the user is looking straight ahead and the pupil 64 is facing the front direction with respect to the user's face, the state becomes, for example, the state of FIG. 7, and a plurality of the image light beams 26*a* enter the pupil 64 and the image is projected on the retina 62. Of the plurality of the image light beams 26*a*, the image light beam 26*aa* corresponding to the center of the image projected onto the retina 62 enters the eye 60 from substantially the same direction as the direction in which the pupil 64 is facing. At this time, the convergence point 44 at which the plurality of the image light beams 26*a* reflected by the reflecting mirror 18 converge is located in the center part of the lens 22, and the plurality of the image light beams 26*a* pass through the center part of the lens 22 and enter the projection mirror 20. The plurality of the image light beams 26*a* pass through the center part of the lens 22, and thus pass through the lens 22 with little refraction. The image light beam 26*aa* has a conjugate relationship between the scanning unit 16 and the convergence point 46.

As illustrated in FIG. 10A, when the user turns his/her line of sight to the right to see the right side of the image, the pupil 64 moves to the right with respect to the user's face. The drive control unit 54 controls the drive unit 24 to move the reflecting mirror 18 so that the incident positions of the plurality of the image light beams 26*a* on the lens 22 change in order to cause the plurality of the image light beams 26*a* to enter the pupil 64 even when the pupil 64 has moved in the right direction. For example, the drive unit 24 moves the reflecting mirror 18 so that the reflecting mirror 18 swings around a swing center point 32 near the vertex of the concave curved surface of the reflecting mirror 18 that is a concave mirror. The projection control unit 56 controls the light source 12 and the scanning unit 16 so that the image light beam 26*aa* enters the vicinity of the swing center point 32 of the reflecting mirror 18.

The positions of the lens 22 where the plurality of the image light beams 26*a* enter change, and the convergence point 44 at which the plurality of the image light beams 26*a* converge is positioned in the left region of the lens 22 with respect to the traveling direction of the image light beams 26*a*. The plurality of the image light beams 26*a* pass through the left region of the lens 22, and thus are refracted to the right side in the traveling direction by the lens 22, and then enter the projection mirror 20. Accordingly, the incident positions and the incident angles of the plurality of the image light beams 26*a* incident on the projection mirror 20 change from the state of FIG. 7. Therefore, even when the pupil 64 has moved in the right direction, the plurality of the image light beams 26*a* enter the pupil 64. At least the image light beam 26*aa* of the plurality of the image light beams 26*a* is incident on the pupil 64 from the left side opposite to the direction (right direction) in which the pupil 64 has moved with respect to the direction T in which the pupil 64 is directed after the pupil 64 has moved, and is projected to the right region (that is, the direction of the line of sight), which corresponds the direction in which the pupil 64 has moved, of the retina 62. Even when the reflecting mirror 18 moves in this manner, the image light beam 26*aa* maintains a conjugate relationship between the scanning unit 16 and the convergence point 46. In the present embodiment, the point where the image light beam 26*aa* enters the reflecting mirror 18 substantially coincides with the swing center point 32 (for example, the vertex of the free-form surface) of the reflecting mirror 18.

As illustrated in FIG. 10B, when the user turns his/her line of sight to the left to look at the left side of the image, the pupil 64 moves to the left with respect to the user's face. The drive control unit 54 controls the drive unit 24 to move the reflecting mirror 18 so that the incident positions of the plurality of the image light beams 26*a* on the lens 22 change in order to cause the plurality of the image light beams 26*a* to enter the pupil 64 even when the pupil 64 has moved in the left direction. For example, the drive unit 24 moves the reflecting mirror 18 so that the reflecting mirror 18 swings around the swing center point 32 near the vertex of the concave curved surface of the reflecting mirror 18 that is a concave mirror. The projection control unit 56 controls the light source 12 and the scanning unit 16 so that the image light beam 26*aa* enters the vicinity of the swing center point 32 of the reflecting mirror 18.

The positions of the lens 22 where the plurality of the image light beams 26*a* enter change, and the convergence point 44 where the plurality of the image light beams 26*a* converge is positioned in the right region of the lens 22 with respect to the traveling direction of the image light beams 26*a*. The plurality of the image light beams 26*a* pass through the right region of the lens 22, and thus are refracted to the left side in the traveling direction by the lens 22, and then enter the projection mirror 20. Accordingly, the incident positions and the incident angles of the plurality of the image light beams 26*a* on the projection mirror 20 are changed from the state of FIG. 7. Therefore, even when the pupil 64 has moved in the left direction, the plurality of the image light beams 26*a* enter the pupil 64. At least the image light beam 26*aa* of the plurality of the image light beams 26*aa* is incident on the pupil 64 from the right side opposite to the direction (left direction) in which the pupil 64 has moved with respect to the direction T in which the pupil 64 is facing, and is projected onto the left side region of the retina 62, which corresponds to the direction in which the pupil 64 has moved. Even when the reflecting mirror 18 moves in this manner, the image light beam 26*aa* maintains a conjugate relationship between the scanning unit 16 and the convergence point 46.

As illustrated in FIG. 10A and FIG. 10B, even when the reflecting mirror 18 is moved so as to swing, the distance L between the lens 22 and the condensing point 30 of the image light beam 26*aa* is set to be substantially the same as the length L in FIG. 7. This is because, when the position of the condensing point 30 changes due to the swing of the reflecting mirror 18 following the movement of the pupil 64, the spot diameter of the image light beam 26*aa* reflected by the projection mirror 20 changes because the image light beam 26*aa* after the condensing point 30 is a diffusion light beam, and as a result, the spot diameter of the image light beam 26*aa* projected onto the retina 62 changes, and the state of defocus occurs depending on the viewing position. As described above, in order to keep the distance L between the lens 22 and the condensing point 30 unchanged even when the incident positions of the plurality of the image light beams 26*a* on the lens 22 are changed, a lens having image height characteristics in a range applicable to this is used as the lens 22. The lens 22 is also required to have an effective diameter sufficient to cover the projection area of the image light beam 26*a* due to the swing of the reflecting mirror 18. Even when the reflecting mirror 18 moves so as to swing, the ratio (L2/L1) of the optical path length L2 of the image light beam 26*aa* between the reflecting mirror 18 and the convergence point 44 to the optical path length L1 of the image light beam 26*aa* between the scanning unit 16 and the reflecting mirror 18 is substantially equal to the ratio (L3/L4) of the optical path length L3 of the image light beam 26*aa* between the convergence point 44 and the projection mirror 20 to the optical path length L4 of the image light beam between the projection mirror 20 and the convergence point 46 (refer to FIG. 8 for L1 to L4). Even when the reflecting mirror 18 moves so as to swing, the convergence angle θ2 (see FIG. 8) at which the plurality of the image light beams 26*a* converge at the convergence point 46 hardly changes.

FIG. 10A and FIG. 10B illustrate a case where the pupil 64 moves in the horizontal direction (that is, a case where the eye 60 rotates in the horizontal direction) as an example, but do not intend to suggest any limitation. Even when the pupil 64 moves in other directions such as the vertical direction, the plurality of the image light beams 26*a* enter the pupil 64 by moving the reflecting mirror 18 so that the positions where the plurality of the image light beams 26*a* enter the lens 22 change in accordance with the direction of the movement. At least the image light beam 26*aa* of the plurality of the image light beams 26*aa* enters the pupil 64 from the side opposite to the direction in which the pupil 64 has moved with respect to the direction T in which the pupil 64 faces, and are projected onto the region of the retina 62 on the side to which the pupil 64 has moved.

Figure 11A:
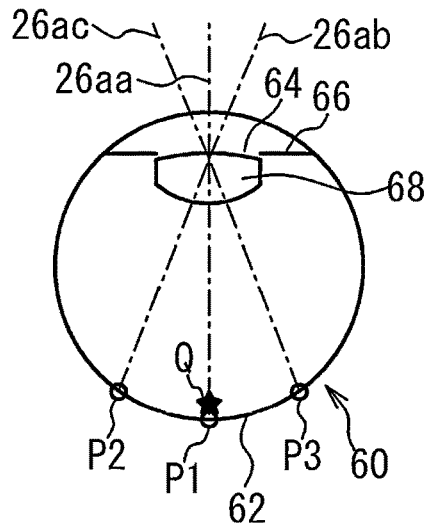
FIG. 11A to FIG. 11C are diagrams for describing the movement of the pupil and the image light beams projected onto the retina.
Figure 11B:
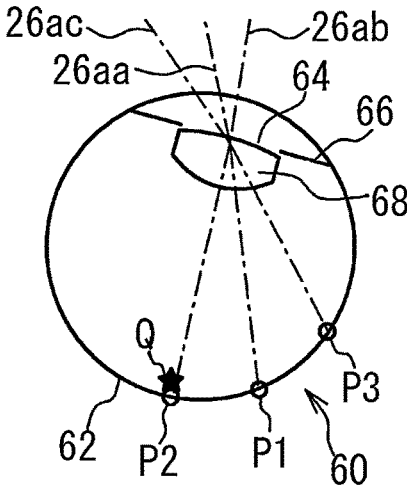
Figure 11C:
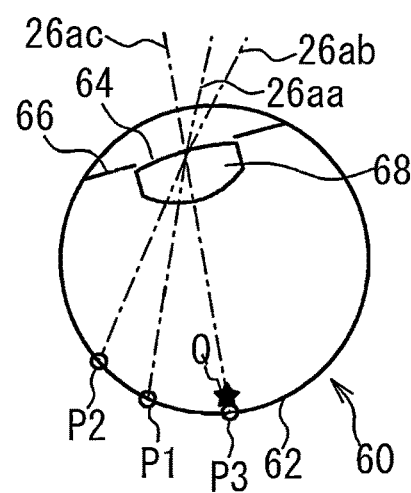

FIG. 11A to FIG. 11C are diagrams for describing the movement of the pupil 64 and the image light beams 26*a* projected onto the retina 62. As illustrated in FIG. 11A, when the pupil 64 faces the front with respect to the user's face, the image light beam 26*aa* of a plurality of the image light beams 26*aa*, 26*ab*, and 26*ac* enters from substantially the front of the pupil 64. The image light beams 26*aa*, 26*ab*, and 26*ac* pass through the approximate center of the pupil 64 and are projected onto the retina 62. The image light beam 26*aa* corresponding to a pixel P1 at the center of the image projected onto the retina 62 is projected on the position Q of the retina 62. The image light beam 26*ab* corresponding to a pixel P2 is projected on the left side of the position Q, and the image light beam 26*ac* corresponding to a pixel P3 is projected on the right side of the position Q. The image visually recognized by the user is an inverted image of the image projected on the retina 62. Therefore, the user visually recognizes the image in which the pixel P1 is located at the center, the pixel P2 is located on the right side, and the pixel P3 is located on the left side. Thus, the coordinate system at which the user views corresponds to the coordinate system at which the user views the projection mirror 20.

As illustrated in FIG. 11B, when the user moves the pupil 64 to the right with respect to the user's face in order to see the pixel P2 of the image projected on the retina 62, at least the image light beams 26*aa* and 26*ac* enter the pupil 64 from the left side opposite to the direction in which the pupil 64 is directed by moving the reflecting mirror 18 as described above. Even in this case, the image light beams 26*aa*, 26*ab*, and 26*ac* pass through the approximate center of the pupil 64. The image light beams 26*aa* and 26*ac* are projected onto the right region of the retina 62. The image light beam 26*ab* corresponding to the pixel P2 of the image projected onto the retina 62 is projected on the position Q of the retina 62. Therefore, the position of the line of sight of the user with respect to the image projected on the retina 62 is the pixel P2, and the user can view the image in which the pixel P2 that the user wants to view is positioned at the center.

As illustrated in FIG. 11C, when the user moves the pupil 64 to the left with respect to the user's face to see the pixel P3 of the image projected on the retina 62, at least the image light beams 26*aa* and 26*ab* enter the pupil 64 from the right side opposite to the direction in which the pupil 64 is directed by moving the reflecting mirror 18 as described above. Even in this case, the image light beams 26*aa*, 26*ab*, and 26*ac* pass through the approximate center of the pupil 64. The image light beams 26*aa* and 26*ab* are projected onto the left region of the retina 62. The image light beam 26*ac* corresponding to the pixel P3 of the image projected onto the retina 62 is projected on the position Q of the retina 62. Therefore, the position of the line of sight of the user with respect to the image projected on the retina 62 is the pixel P3, and the user can view the image in which the pixel P3 that the user wants to view is positioned at the center.

Figure 12A:
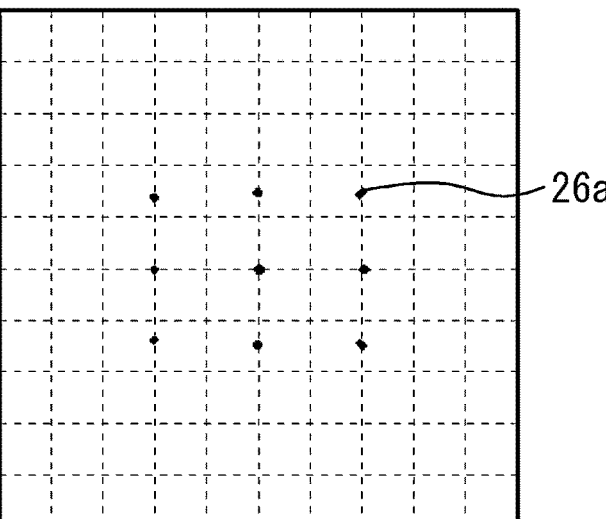
FIG. 12A to FIG. 12C present simulation results of evaluating the user's view of an image projected on the retina.
Figure 12B:
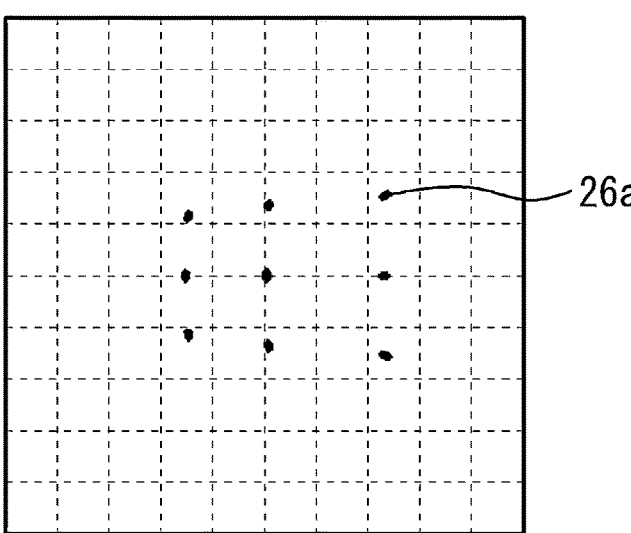
Figure 12C:
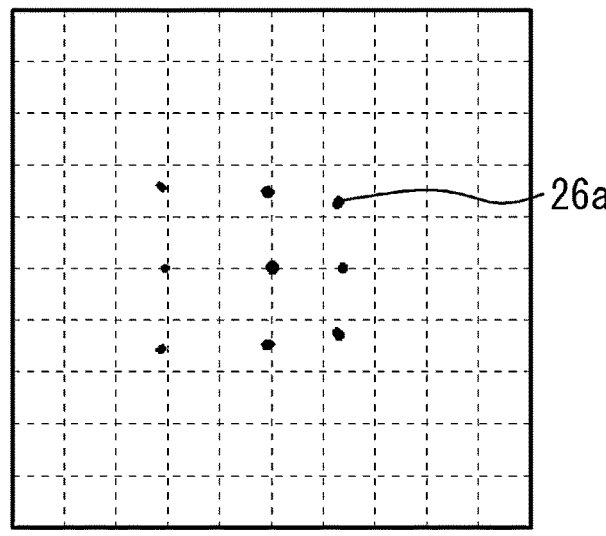

FIG. 12A to FIG. 12C present simulation results of evaluating the user's view of the image projected on the retina 62. In FIG. 12A to FIG. 12C, it is assumed that an image with a viewing angle of 26° is projected on the retina 62. FIG. 12A presents the simulation result when the pupil 64 is facing the front as illustrated in FIG. 7. FIG. 12B presents the simulation result when the eye 60 is rotated to the right by 13° so that the pupil 64 faces right and the swing angle of the reflecting mirror 18 is set to 5° as illustrated in FIG. 10A. FIG. 12C presents the simulation results when the eye 60 is rotated to the left by 13° so that the pupil 64 faces the left and the swing angle of the reflecting mirror 18 is set to 5° as illustrated in FIG. 10B. In FIG. 12A, the image light beam 26a located at the center is projected to the center of the retina 62, in FIG. 12B, the image light beam 26a located at the center of the right column is projected to the center of the retina 62, and in FIG. 12C, the image light beam 26a located at the center of the left column is projected to the center of the retina 62.

As illustrated in FIG. 12A, when the pupil 64 faces the front with respect to the user's face, the user visually recognizes a substantially rectangular image. As illustrated in FIG. 12B, when the pupil 64 moves to the right with respect to the user's face, the user visually recognizes an image in which the right region is enlarged. As illustrated in FIG. 12C, when the pupil 64 moves to the left with respect to the user's face, the user visually recognizes an image in which the left region is enlarged.

As illustrated in FIG. 12B and FIG. 12C, when the reflecting mirror 18 is moved as described above in accordance with the direction in which the pupil 64 has moved, the user can view the image with less discomfort because the image in the region on the side that the user has looked at is seen large. Since the image itself projected on the retina 62 is distorted in a substantially trapezoidal shape, a process of eliminating the trapezoidal distortion may be performed. For example, the trapezoidal distortion of the image projected on the retina 62 may be reduced by performing a process for generating the opposite trapezoidal distortion in the image itself to be projected in advance.

As described above, in the embodiment, the drive control unit 54 controls the drive unit 24 to move the reflecting mirror 18 (reflection unit) so that the positions where the plurality of the image light beams 26a enter the lens 22 change according to the direction in which the pupil 64 has moved, which is detected by the detection unit 52. Thus, as illustrated in FIG. 10A and FIG. 10B, a plurality of the image light beams 26a that have passed through the lens 22 (optical member) provided at the convergence point 44 (second convergence point) and entered the projection mirror 20 (projection unit) enter the pupil 64 and converge at the convergence point 46 (first convergence point) in the eye 60, and are then projected onto the retina 62 even when the pupil 64 has moved. Therefore, even when the pupil 64 moves, a plurality of the image light beams 26a can be made to enter the pupil 64 to project an image on the retina 62.

In the embodiment, as illustrated in FIG. 10A and FIG. 10B, when the pupil 64 has moved from the front to the other direction, the drive control unit 54 controls the drive unit 24 to move the reflecting mirror 18 so that the incident positions of the plurality of the image light beams 26a on the lens 22 move from the center part of the lens 22 to a region on the side opposite to the direction corresponding to the direction in which the pupil 64 has moved with respect to the direction in which the plurality of the image light beams 26a pass through the lens 22. The lens 22 refracts the plurality of the image light beams 26a incident on the lens 22 in a direction corresponding to the direction in which the pupil 64 has moved. This allows the plurality of the image light beams 26a to enter the pupil 64 even when the pupil 64 has moved.

In the embodiment, as illustrated in FIG. 10A and FIG. 10B, when the pupil 64 has moved from the front to the other direction, the drive control unit 54 controls the drive unit 24 to move the reflecting mirror 18 so that at least the image light beam 26aa corresponding to the center of the image projected onto the retina 62 among the plurality of the image light beams 26a is made to enter the pupil 64 from the side opposite to the direction in which the pupil 64 has moved with respect to the direction T in which the moved pupil 64 after movement is facing, and to be projected on a region of the retina 62 on the side corresponding to the direction in which the pupil 64 has moved. As a result, as described with reference to FIG. 11B and FIG. 11C, the user can visually recognize an image centered on a part of the image projected on the retina 62 that the user is trying to look at by moving the line of sight.

In the embodiment, as illustrated in FIG. 10A and FIG. 10B, the drive unit 24 moves the reflecting mirror 18 so that the reflecting mirror 18 swings around the swing center point 32 near the center part of the reflecting mirror 18. The projection control unit 56 projects an image light beam corresponding to the approximate center of the image projected onto the retina 62 among the plurality of the image light beams 26a to the swing center point 32. This allows the plurality of the image light beams 26a to easily and reliably enter the pupil 64 even when the pupil 64 has moved. The drive unit 24 may move the reflecting mirror 18 so that the reflecting mirror 18 swings around the point where the image light beam corresponding to the approximate center of the image among the plurality of the image light beams 26a enters. The approximate center of the image is within a region of 1/50 times the size of the image from the center of the image.

In the embodiment, as illustrated in FIG. 7, FIG. 10A, and FIG. 10B, the distance L between the lens 22 and the condensing point 30 of the image light beam 26a is substantially constant even when the reflecting mirror 18 moves. Thus, even when the plurality of the image light beams 26a obliquely enter the lens 22, the plurality of the image light beams 26a can be focused near the retina 62. The term "substantially constant" means substantially constant to the extent that the plurality of the image light beams 26a are focused near the retina 62, and allows a case where the difference between the distance L before the reflecting mirror 18 moves and the distance L after the reflecting mirror 18 moves is equal to or less than ±5% of the distance L before the reflecting mirror 18 moves.

In the embodiment, for the image light beam 26a, the ratio (L2/L1) of the optical path length L2 between the reflecting mirror 18 and the convergence point 44 to the optical path length L1 between the scanning unit 16 and the reflecting mirror 18 is substantially the same as the ratio (L3/L4) of the optical path length L3 between the convergence point 44 and the projection mirror 20 to the optical path length L4 between the projection mirror 20 and the convergence point 46 even when the reflecting mirror 18 moves. Thus, even when the reflecting mirror 18 moves, the reflecting mirror 18 can reduce the optical influence of the projection mirror 20 on the image light beam 26a. The term "the substantially same" means the substantially same to the extent that the optical influence of the projection mirror 20 can be reduced by the reflecting mirror 18 and allows a case where the difference between the ratio (L2/L1) of the optical path length L2 to the optical path length L1 and the ratio (L3/L4) of the optical path length L3 to the optical path length L4 is equal to or less than ±5% of the average value of the ratio (L2/L1) of the optical path length L2 to the optical path length L1 and the ratio (L3/L4) of the optical path length L3 to the optical path length L4.

In the embodiment, the convergence angle θ2 at which the plurality of the image light beams 26a converge at the convergence point 46 is substantially constant even when the reflecting mirror 18 moves. Thus, even when the reflecting mirror 18 moves, an image having a similar viewing angle can be projected onto the retina 62. The term "substantially constant" means substantially constant to the extent that the viewing angle of the image projected onto the retina 62 is almost the same, and allows a case where the difference between the convergence angle θ2 before the reflecting mirror 18 moves and the convergence angle θ2 after the reflecting mirror 18 moves is equal to or less than ±10% of the convergence angle θ2 before the reflecting mirror 18 moves.

Figure 13:
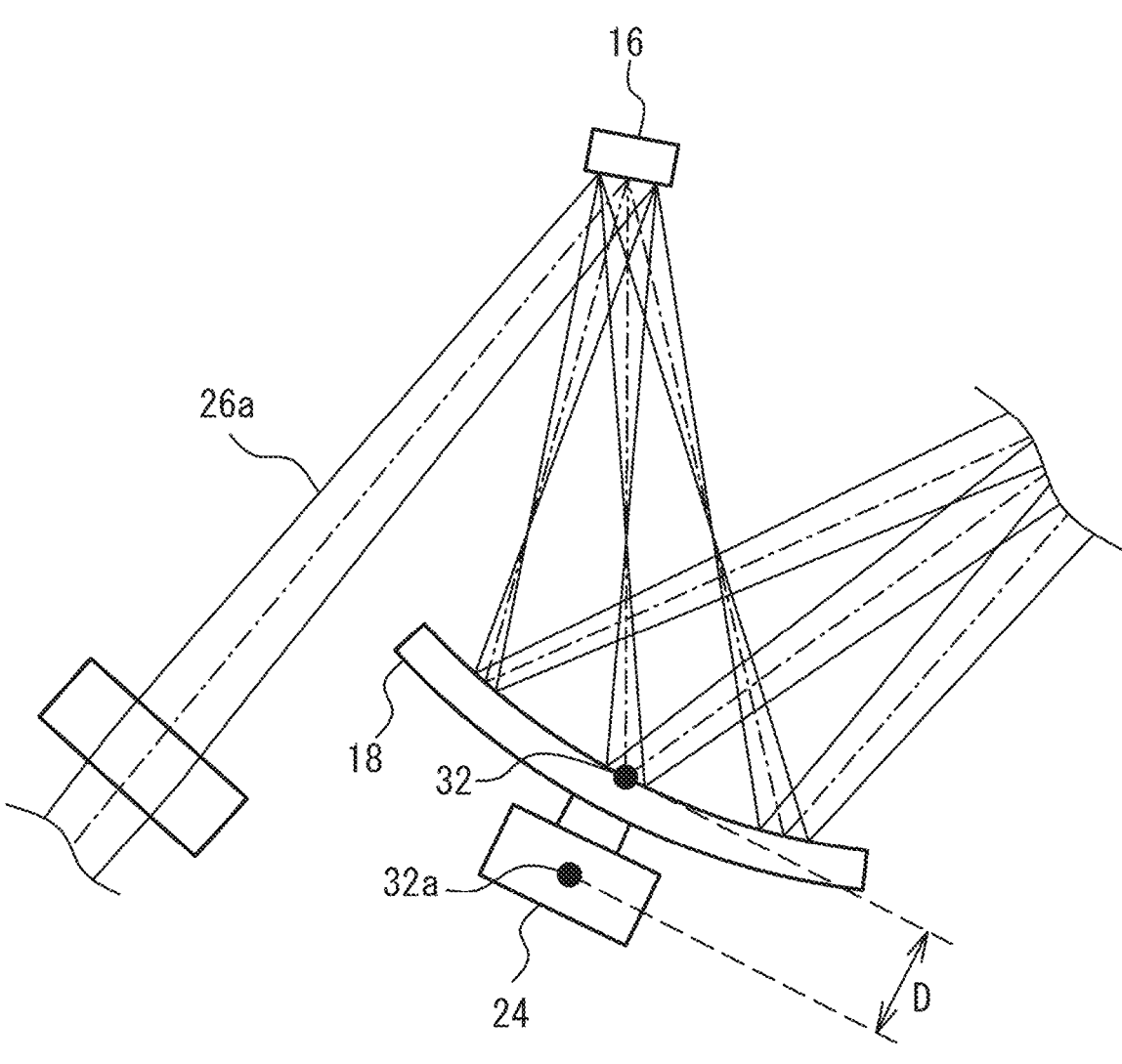
FIG. 13 is an enlarged view of the vicinity of a reflecting mirror.

In the embodiment, the description has been given under the assumption that the swing center point 32 of the reflecting mirror 18 is on the reflecting mirror 18 and near the vertex of the concave surface of its center part, but the swing center point 32 of the reflecting mirror 18 may not necessarily be on the reflecting mirror 18 but at an offset position. This will be described with reference to FIG. 13. FIG. 13 is an enlarged view of the vicinity of the reflecting mirror 18. As illustrated in FIG. 13, in the embodiment, the case where the swing center point 32 is located near the vertex of the concave surface of the reflecting mirror 18 and the reflecting mirror 18 is swung around the swing center point 32 by the drive unit 24 is described as an example. However, this does not intend to suggest any limitation, and depending on the driving mechanism of the drive unit 24, a swing center point 32a may be located at a position offset in the direction of the drive unit 24 (the opposite direction to the projection mirror 20), and the reflecting mirror 18 may swing around the swing center point 32a. The distance D between the swing center point 32 and the swing center point 32a may be about 5 mm at the maximum. The distance D is a distance that may occur when the components used in the present embodiment are arranged inside the spectacle-type frame of the head mounted display as in the present embodiment. As illustrated in FIG. 12, as the distance D increases, distortion of the image is visually recognized by the user, but there is little influence when the distance is about 5 mm. The swing center point 32 is located in the vicinity of the center part of the reflecting mirror 18 within a range of the distance D.

In the embodiment, the detection unit 52 detects the direction in which the pupil 64 has moved based on the detection result of the optical detector 40 that detects the reflected light beam 28 of the detection light beam 26b reflected by the iris 66. However, the detection unit 52 may detect the direction in which the pupil 64 has moved by other generally known methods. For example, the detection unit 52 may detect the direction in which the pupil 64 has moved from the captured image of the eye 60 captured by a camera.

In the embodiment, the reflecting mirror 18 and the projection mirror 20 are not limited to the concave mirrors, and may be other optical components such as a combination of lenses and mirrors, or a diffraction element, other than the curved mirrors, as long as they have positive condensing power. The lens 22 is not limited to a convex lens, and may be another optical member such as a mirror or a diffractive element as long as it can make the image light beam 26a enter the projection mirror 20 as a diffusion light beam. The lens 22 may have a function of suppressing chromatic aberration.

[Variation]

Figure 14:
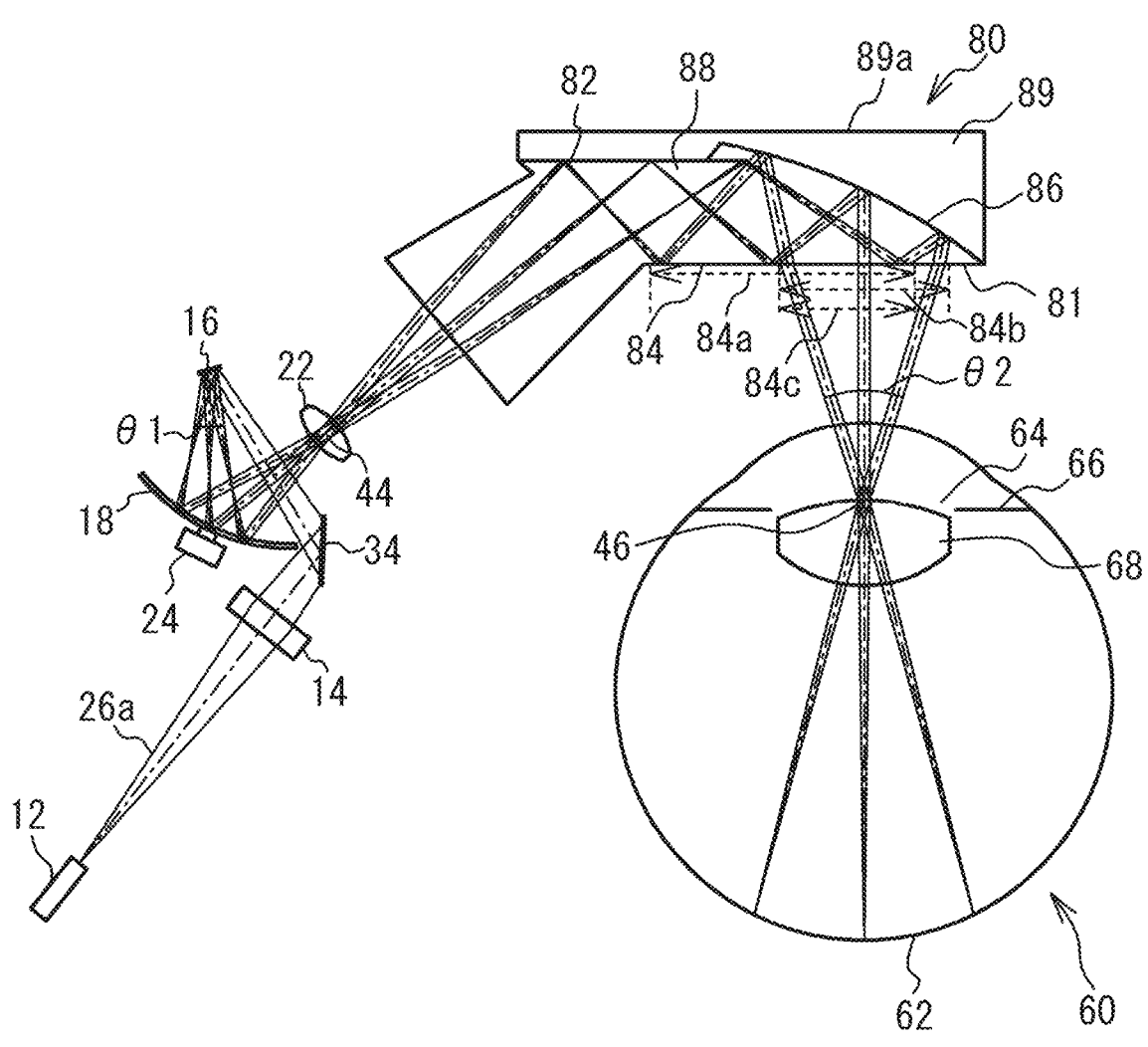
FIG. 14 illustrates an optical system according to a variation of the embodiment.

FIG. 14 illustrates an optical system according to a variation of the embodiment. The variation of the embodiment is the same as the image projection device 100 according to the embodiment except for the optical system illustrated in FIG. 14. In FIG. 14, for the sake of clarity of the drawing, only the image light beam 26a of the light beam 26 is illustrated, and the detection light beam 26b is not illustrated, but the detection light beam 26b is also projected onto the eye 60 in the same manner as the image light beam 26a. As illustrated in FIG. 14, in the variation of the embodiment, the image light beam 26a transmitted through the lens 14 is reflected by a reflecting mirror 34 and enters the scanning unit 16. The reflecting mirror 34 is a plane mirror.

The image light beam 26a reflected by the reflecting mirror 18 and transmitted through the lens 22 enters a light guide member 80. The light guide member 80 includes a main body portion 88 through which a plurality of the image light beams 26a travel while being reflected by reflection surfaces 82 and 84 and a projection surface 86 to enter the pupil 64, and a cover portion 89 attached to the main body portion 88 so as to cover the reflection surface 82 and the projection surface 86 from the outside. The main body portion 88 and the cover portion 89 are formed of glass materials having substantially the same refractive index, for example, the same glass material. The main body portion 88 and the cover portion 89 are formed of a glass material such as cycloolefin polymer (COP) resin or acrylic resin, for example. The light guide member 80 may include only the main body portion 88 without the cover portion 89.

The image light beam 26a passes through the inside of the main body portion 88. The main body portion 88 has a plurality of the reflection surfaces 82 and 84 and the projection surface 86. The reflection surfaces 82 and 84 and the projection surface 86 are formed by, for example, depositing a reflecting material on a glass material. The image light beam 26a is reflected in the main body portion 88 in the order of the reflection surface 82, the reflection surface 84, and the projection surface 86, and is emitted to the outside from the main body portion 88. The reflecting surfaces 82 and 84 are substantially flat surfaces and are provided substantially parallel to each other.

The plurality of the image light beams 26a incident on the main body portion 88 travel toward the reflection surface 82 while converging. Each of the plurality of the image light beams 26a is condensed near the reflection surface 82. Each of the plurality of the image light beams 26a reflected by the reflection surface 82 travels toward the reflection surface 84. For example, all of the plurality of the image light beams 26a are condensed before the reflection surface 84, and then become diffusion light beams and enter the reflection surface 84. Each of the plurality of the image light beams 26a reflected by the reflection surface 84 enters the projection surface 86 in a diffusion light state.

The projection surface 86 is a concave mirror and has a positive condensing power. Therefore, each of the plurality of the image light beams 26a reflected by the projection surface 86 is converted from a diffusion light beam into a substantially parallel light beam, and the plurality of the image light beams 26a converge at the convergence point 46 in the eye 60 of the user. The image light beam 26*a* is converted from the substantially parallel light beam to a convergent light beam by the crystalline lens 68 and is focused in the vicinity of the retina 62. Thus, the projection surface 86 corresponds to a projection unit that converges the plurality of the image light beams 26*a* emitted in different directions from the scanning unit 16 by being scanned by the scanning unit 16 at the convergence point 46 in the eye 60 and then projects the image light beams 26*a* on the retina 62 to project an image on the retina 62.

The curvature of the projection surface 86 may be appropriately set so that the convergence angle θ2 at which the plurality of the image light beams 26*a* converge at the convergence point 46 is larger than the scanning angle θ1 of the scanning unit 16. This increases the viewing angle of the image projected onto the retina 62.

The reflection surface 84 has a region 84*a* that reflects the image light beam 26*a* reflected by the reflection surface 82 toward the projection surface 86 and a region 84*b* that transmits the image light beam 26*a* reflected by the projection surface 86, and the regions 84*a* and 84*b* partially overlap each other. In an overlapping region 84*c*, both the function of reflecting the image light beam 26*a* and the function of transmitting the image light beam 26*a* are required. The incident angle at which the image light beam 26*a* reflected by the reflection surface 82 enters the reflection surface 84 is larger than the incident angle at which the image light beam 26*a* reflected by the projection surface 86 enters the reflection surface 84. Therefore, by providing the angle dependency such that the image light beam 26*a* having a large incident angle is mainly reflected and the image light beam 26*a* having a small incident angle is mainly transmitted at least in the region 84*c* of the reflection surface 84, it is possible to achieve both the reflection of the image light beam 26*a* reflected by the reflection surface 82 and the transmission of the image light beam 26*a* reflected by the projection surface 86. Further, since the image light beam 26*a* reflected by the projection surface 86 is only required to be projected onto the retina 62 and the image light beam 26*a* reflected by the reflection surface 82 has substantially no influence even when the image light beam 26*a* reflected by the reflection surface 82 passes through the reflection surface 84, the use of a half mirror for the reflection surface 84 achieves both the reflection of the image light beam 26*a* reflected by the reflection surface 82 and the transmission of the image light beam 26*a* reflected by the projection surface 86.

An emission surface 81 from which the plurality of the image light beams 26*a* reflected by the projection surface 86 are emitted from the main body portion 88 is flatter than the projection surface 86. A surface 89*a* on the side opposite to the emission surface 81 of the main body portion 88 with respect to the projection surface 86 of the cover portion 89 is flatter than the projection surface 86. The surface 89*a* of the cover portion 89 and the emission surface 81 of the main body portion 88 are, for example, substantially parallel to each other and substantially flat. The reflection surfaces 82 and 84 and the projection surface 86 are all half mirrors.

In the variation of the embodiment, the plurality of the image light beams 26*a* scanned by the scanning unit 16 are converged at the convergence point 44 before the light guide member 80 by the reflecting mirror 18 and then enter the light guide member 80. The light guide member 80 is formed of a glass material through which the plurality of the image light beams 26*a* pass, and reflects the plurality of the image light beams 26*a* by the reflection surfaces 82 and 84 to guide the plurality of the image light beams 26*a* to the projection surface 86 (projection unit). Even in this case, by moving the reflecting mirror 18 so that the positions where the plurality of the image light beams 26*a* enter the lens 22 change in accordance with the direction in which the pupil 64 has moved, the plurality of the image light beams 26*a* can be incident on the pupil 64 even when the pupil 64 has moved. Further, the image light beam 26*a* travels inside the light guide member 80 from the temple side of the spectacle-type frame 42 toward the eye 60, and the components of the projection unit 10 such as the scanning unit 16 can be arranged along the contour of the user's face. Therefore, a sufficient clearance can be secured between the image projection device and the user's face.

In the variation of the embodiment, the light guide member 80 includes the main body portion 88 through which the plurality of the image light beams 26*a* repeatedly reflected by the plurality of the reflection surfaces 82 and 84 and the projection surface 86 and projected onto the retina 62 pass, and the cover portion 89 that covers the projection surface 86 and has substantially the same refractive index as the main body portion 88. The projection surface 86 is a half mirror. The surface 89*a* of the cover portion 89 and the emission surface 81 of the main body portion 88 are flatter than the projection surface 86. Thus, the user can visually recognize the outside world with less discomfort. Therefore, it is compatible with Augmented Reality (AR), which superimposes virtual visual information on real scenery. "The main body portion 88 and the cover portion 89 have substantially the same refractive index" means that the main body portion 88 and the cover portion 89 have substantially the same refractive index to the extent that the user can view the outside world with less discomfort, and the difference in refractive index is 0.05 or less.

In the variation of the embodiment, the surface 89*a* of the cover portion 89 may be a concave curved surface or a convex curved surface according to the correction power in order to correct the vision of the user. Therefore, the surface 89*a* of the cover portion 89 being a substantially flat surface includes a case where the surface 89*a* is a curved surface to the extent that it corrects vision, and refers to a flat surface to the extent that the user can view the outside world with less discomfort. "The surface 89*a* of the cover portion 89 and the emission surface 81 of the main body portion 88 are substantially parallel" means that the surface 89*a* of the cover portion 89 and the emission surface 81 of the main body portion 88 are substantially parallel to the extent that the user can view the outside world with less discomfort even when the surface 89*a* of the cover portion 89 is curved to the extent that it corrects vision.

In the embodiment and the variation thereof, the convergence angle θ2 at which the plurality of the image light beams 26*a* converge at the convergence point 46 is preferably equal to or larger than the scanning angle θ1 of the scanning unit 16 in both cases before and after the reflecting mirror 18 moves. This allows the viewing angle of the image projected onto the retina 62 to remain large.

In the embodiment and the variation thereof, the case where the image projection device is attached to the spectacle-type frame 42 has been described as an example. However, the frame is not limited to the spectacles-type frame, and may be other types such as a goggle-type frame, an eye patch-type frame, an ear-hook-type frame, and a helmet-mounted frame as long as the frame can be mounted on the face of the user and the image projection device can be installed in front of the eye of the user.

Although embodiments of the present invention have been described so far, the present invention is not limited to those particular embodiments, and various changes and modifications may be made to them within the scope of the invention claimed herein.

The invention claimed is:

1. An image projection device comprising:
a light source;
a scanning unit that scans an image light beam emitted from the light source;
a projection unit that is disposed in front of an eye of a user, and converges a plurality of image light beams emitted in different directions from the scanning unit by being scanned by the scanning unit at a first convergence point in the eye of the user and then projects the plurality of image light beams onto a retina to project an image onto the retina;
a reflection unit that converges the plurality of image light beams emitted in the different directions from the scanning unit at a second convergence point before the projection unit;
an optical member that is provided between the projection unit and the reflection unit, converts each of the plurality of image light beams into a convergent light beam, condenses each of the plurality of image light beams at a condensing point before the projection unit, and then causes each of the plurality of image light beams to enter the projection unit as a diffusion light beam;
a drive unit configured to move the reflection unit;
a detection unit configured to detect a direction in which a pupil of the user has moved; and
a drive control unit configured to control the drive unit to move the reflection unit so that positions where the plurality of image light beams enter the optical member change in accordance with the direction in which the pupil has moved, which is detected by the detection unit.

2. The image projection device according to claim 1, wherein when the pupil has moved from a direction facing the front with respect to a face of the user to another direction, the drive control unit controls the drive unit to move the reflection unit so that incident positions of the plurality of image light beams on the optical member are moved from a center part of the optical member to a region on a side opposite to a direction corresponding to the direction in which the pupil has moved with respect to a direction in which the plurality of image light beams pass through the optical member, thereby causing the optical member to refract the plurality of image light beams that have entered the optical member in the direction corresponding to the direction in which the pupil has moved.

3. The image projection device according to claim 1, wherein when the pupil has moved from a direction facing the front with respect to a face of the user to another direction, the drive control unit controls the drive unit to move the reflection unit so that at least an image light beam corresponding to a center of the image among the plurality of image light beams enters the pupil from a side opposite to the direction in which the pupil has moved with respect to a direction in which the pupil after movement is facing and is projected onto a region of the retina on a side of the direction in which the pupil has moved.

4. The image projection device according to claim 1, further comprising:
a projection control unit that controls projection of the image light beam,
wherein the drive unit moves the reflection unit so that the reflection unit swings about a swing center point near a center part of the reflection unit, and
wherein the projection control unit projects an image light beam corresponding to an approximate center of the image among the plurality of image light beams to the swing center point.

5. The image projection device according to claim 1, wherein the optical member has image height characteristics in which a distance between the optical member and the condensing point of the image light beam is substantially constant even when the reflection unit moves and thereby a region on which the plurality of image light beams are incident changes.

6. The image projection device according to claim 1, wherein a ratio of an optical path length of the image light beam between the reflection unit and the second convergence point to an optical path length of the image light beam between the scanning unit and the reflection unit is substantially the same as a ratio of an optical path length of the image light beam between the second convergence point and the projection unit to an optical path length of the image light beam between the projection unit and the first convergence point even when the reflection unit moves.

7. The image projection device according to claim 1, wherein a convergence angle at which the plurality of image light beams converge at the first convergence point is substantially constant even when the reflection unit moves.

8. The image projection device according to claim 1, further comprising:
a light guide member that includes the projection unit, is formed of a glass material through which the plurality of image light beams pass, and reflects the plurality of image light beams by a plurality of reflection surfaces to guide the plurality of image light beams to the projection unit,
wherein the optical member is provided between the light guide member and the reflection unit.

9. The image projection device according to claim 1, wherein the projection unit and the reflection unit are concave mirrors, and
wherein the optical member is a convex lens.

* * * * *